(12) United States Patent
Kobayashi et al.

(10) Patent No.: US 12,020,462 B2
(45) Date of Patent: Jun. 25, 2024

(54) INFORMATION PROCESSING APPARATUS, INFORMATION PROCESSING METHOD, AND COMPUTER PROGRAM PRODUCT

(71) Applicants: Hiroshi Kobayashi, Kanagawa (JP); Takahiro Watanabe, Kanagawa (JP); Ryo Taneda, Kanagawa (JP)

(72) Inventors: Hiroshi Kobayashi, Kanagawa (JP); Takahiro Watanabe, Kanagawa (JP); Ryo Taneda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 17/391,308

(22) Filed: Aug. 2, 2021

(65) Prior Publication Data

US 2022/0044012 A1 Feb. 10, 2022

(30) Foreign Application Priority Data

Aug. 6, 2020 (JP) ................. 2020-133940

(51) Int. Cl.
| | |
|---|---|
| *G06K 9/00* | (2022.01) |
| *G06V 10/22* | (2022.01) |
| *G06V 30/412* | (2022.01) |
| *G06V 30/416* | (2022.01) |
| *G06V 30/10* | (2022.01) |

(52) U.S. Cl.
CPC .......... *G06V 10/225* (2022.01); *G06V 30/412* (2022.01); *G06V 30/416* (2022.01); *G06V 30/10* (2022.01)

(58) Field of Classification Search
None
See application file for complete search history.

(56) References Cited

U.S. PATENT DOCUMENTS

| | | | | |
|---|---|---|---|---|
| 6,801,658 B2 * | 10/2004 | Morita | ................. | G06V 30/412 382/137 |
| 7,117,171 B1 * | 10/2006 | Pollin | .................... | G06Q 40/12 705/40 |
| 8,724,907 B1 * | 5/2014 | Sampson | ............ | G06F 18/2433 382/209 |

(Continued)

FOREIGN PATENT DOCUMENTS

| | | |
|---|---|---|
| JP | H05-061897 A | 3/1993 |
| JP | 2006-323717 A | 11/2006 |

(Continued)

OTHER PUBLICATIONS

U.S. Appl. No. 17/146,686, filed Jan. 12, 2021.
Office Action dated Mar. 5, 2024 issued in corresponding Japanese Patent Application No. 2020-133940.

*Primary Examiner* — Feng Niu
(74) *Attorney, Agent, or Firm* — Harness, Dickey & Pierce, P.L.C.

(57) ABSTRACT

An information processing apparatus includes a processor configured to perform operations including extracting information indicative of an issuer of a form from form image data, and obtaining fixed information corresponding to the information indicative of the issuer of the form by referring to a storage storing the fixed information associated with the issuer of the form, and outputting, to a terminal apparatus, screen data including the information indicative of the issuer of the form and the obtained fixed information.

6 Claims, 21 Drawing Sheets

(56) References Cited

U.S. PATENT DOCUMENTS

| | | | |
|---|---|---|---|
| 9,613,358 B1* | 4/2017 | Gardner | G06Q 20/4097 |
| 10,147,082 B1* | 12/2018 | Wilson | G06Q 20/227 |
| 10,783,325 B1* | 9/2020 | Hecht | G06F 40/174 |
| 11,374,747 B2* | 6/2022 | Sugano | H04L 9/14 |
| 11,588,945 B2* | 2/2023 | Toda | G06V 30/416 |
| 11,631,268 B2* | 4/2023 | Yoshizuka | G06F 40/284 |
| | | | 382/176 |
| 11,770,489 B2* | 9/2023 | Shimakawa | G06V 30/127 |
| | | | 358/462 |
| 2002/0133415 A1* | 9/2002 | Zarovinsky | G06Q 30/0641 |
| | | | 705/26.81 |
| 2003/0021460 A1* | 1/2003 | Kelland | G06V 30/262 |
| | | | 382/137 |
| 2003/0076995 A1* | 4/2003 | Morita | G06Q 40/00 |
| | | | 382/181 |
| 2005/0055283 A1* | 3/2005 | Zarovinsky | G06Q 30/0601 |
| | | | 705/26.1 |
| 2006/0235775 A1* | 10/2006 | Pollin | G06Q 20/04 |
| | | | 705/30 |
| 2015/0371334 A1* | 12/2015 | Ko | G06Q 10/06 |
| | | | 705/36 R |
| 2016/0232600 A1* | 8/2016 | Purves | G06Q 20/351 |
| 2017/0178077 A1* | 6/2017 | Inaba | G06Q 10/10 |
| 2019/0191038 A1* | 6/2019 | Naito | H04N 1/4406 |
| 2020/0026950 A1 | 1/2020 | Kobayashi et al. | |
| 2020/0059359 A1* | 2/2020 | Sugano | H04L 9/0894 |
| 2021/0006677 A1* | 1/2021 | Ushinohama | H04N 1/00474 |
| 2021/0089766 A1* | 3/2021 | Yoshizuka | G06F 40/295 |
| 2021/0124973 A1 | 4/2021 | Aruga et al. | |
| 2021/0166284 A1 | 6/2021 | Kobayashi | |
| 2021/0409550 A1* | 12/2021 | Toda | G06V 30/414 |
| 2022/0019581 A1* | 1/2022 | Minami | G06V 30/347 |
| 2022/0019785 A1* | 1/2022 | Iwasaki | G06V 30/10 |
| 2022/0256048 A1* | 8/2022 | Shimakawa | H04N 1/00824 |
| 2022/0415070 A1* | 12/2022 | Dodov | G06V 30/347 |

FOREIGN PATENT DOCUMENTS

| | | |
|---|---|---|
| JP | 2016-051339 | 4/2016 |
| JP | 6722929 B1 | 7/2020 |
| WO | 2021/059848 A1 | 4/2021 |

* cited by examiner

FIG.3

| ITEM NAME | EXTRACTION REFERENCE POINT | EXTRACTION DIRECTION | EXTRACTION RANGE | DICTIONARY LOOK-UP FLAG |
|---|---|---|---|---|
| BANK NAME | FINANCIAL INSTITUTION, PAYMENT DESTINATION | RIGHT, LOWER DIRECTIONS | 1 | TRUE |
| BRANCH NAME | EXTRACTED "BANK NAME" | RIGHT, LOWER DIRECTIONS | 1 | TRUE |
| ACCOUNT TYPE | EXTRACTED "BANK NAME" | RIGHT, LOWER, AND LEFT DIRECTIONS | 2 | TRUE |
| ACCOUNT TYPE | EXTRACTED "BRANCH NAME" | RIGHT, LOWER DIRECTIONS | 1 | TRUE |
| ACCOUNT NUMBER | EXTRACTED "ACCOUNT TYPE" | RIGHT, LOWER DIRECTIONS | 1 | FALSE |
| ACCOUNT NUMBER | EXTRACTED "BANK NAME" | LOWER DIRECTION | 3 | FALSE |
| ACCOUNT HOLDER'S NAME | EXTRACTED "ACCOUNT NUMBER" | RIGHT DIRECTION | 1 | FALSE |
| ACCOUNT HOLDER'S NAME | EXTRACTED "BANK NAME" | LOWER DIRECTION | 4 | FALSE |
| ACCOUNT HOLDER'S NAME | EXTRACTED "ACCOUNT TYPE" | LOWER DIRECTION | 2 | FALSE |

FIG.4

| BRANCH NAME EXTRACTION CONDITION | ACCOUNT TYPE EXTRACTION CONDITION | ACCOUNT NUMBER EXTRACTION CONDITION |
|---|---|---|
| *BRANCH | ORDINARY ACCOUNT, CHECKING ACCOUNT, SAVINGS ACCOUNT | NUMERICAL VALUE |
| *HEAD OFFICE | | |
| *OFFICE | | |
| *MAIN OFFICE | | |
| *DEPARTMENT | | |

| BANK NAME | BRANCH NAME |
|---|---|
| XXX BANK | AAA BRANCH OFFICE |
| | CCC BRANCH OFFICE |
| | EEE BRANCH OFFICE |
| | ... |
| YYY BANK | FF BRANCH OFFICE |
| | ... |
| XZZ BANK | BBB BRANCH OFFICE |
| | BDD BRANCH OFFICE |
| | ... |
| ... | |

TENANT NAME: ZZZ Co., Ltd.

270

| VENDOR NAME | BASIC INFORMATION | CONTACT PERSON | ... | PAYMENT INFORMATION ||||||||
|---|---|---|---|---|---|---|---|---|---|---|
| | | | | PAYMENT METHOD | FINAN-CIAL INSTI-TUTION | BRANCH OFFICE | ACCOUNT TYPE | ACCOUNT NUMBER | ACCOUNT HOLDER'S NAME | SERVICE FEE | PAYMENT TERMS |
| XXX Co., Ltd. | CORPORATE NAME: ... NAME: ... TELEPHONE NUMBER: ... ZIP CODE: ... ADDRESS: ... | NAME: ... DIVISION: ... E-MAIL ADDRESS: ... TELEPHONE NUMBER: ... | ... | BANK TRANS-FER | XXX BANK | AAA BRANCH OFFICE | ORDINARY ACCOUNT | 1234567 | XXX Co., Ltd. | PAYEE | PAYMENT TERMS: 25TH OF THE MONTH AFTER NEXT |
| YYY Co., Ltd. | CORPORATE NAME: ... NAME: ... TELEPHONE NUMBER: ... ZIP CODE: ... ADDRESS: ... | NAME: ... DIVISION: ... E-MAIL ADDRESS: ... TELEPHONE NUMBER: ... | ... | BANK TRANS-FER | ZZZ BANK | CCC BRANCH OFFICE | ORDINARY ACCOUNT | 7654321 | YYY Co., Ltd. | PAYER | CLOSING DATE: THE END OF MONTH |
| ... | | | | | | | | | | | |

FIG.9

| JOB ID | TENANT ID | FORM IMAGE FILE PATH | RECOGNITION RESULT FILE PATH | STATUS |
|---|---|---|---|---|
| J1 | 101 | ××× | ○○○○ | UNPROCESSED |
| J2 | 102 | ××○ | ... | ... |
| ⋮ | ⋮ | ⋮ | ⋮ | ⋮ |

FIG.12

<sub>121</sub>

| ID | COORDINATE X | COORDINATE Y | WIDTH OF CHARACTER | HEIGHT OF CHARACTER | ACCU-RACY | CHAR-ACTER |
|---|---|---|---|---|---|---|
| 72 | 319 | 552 | 44 | 45 | 99 | B |
| 73 | 363 | 552 | 47 | 45 | 99 | a |
| 74 | 406 | 552 | 43 | 42 | 99 | n |
| 75 | 452 | 552 | 46 | 42 | 99 | k |
| 76 | 319 | 620 | 45 | 45 | 99 | T |
| 77 | 364 | 620 | 46 | 46 | 99 | r |
| 78 | 410 | 620 | 45 | 45 | 99 | a |
| 79 | 455 | 620 | 45 | 45 | 99 | n |
| 80 | 500 | 620 | 45 | 45 | 99 | s |
| 81 | 590 | 620 | 45 | 46 | 99 | f |
| 82 | 635 | 620 | 46 | 45 | 99 | e |
| 83 | 682 | 620 | 45 | 45 | 99 | r |
| 84 | 726 | 620 | 45 | 45 | 99 |   |
| 85 | 771 | 620 | 45 | 45 | 99 |   |

<sub>122</sub>

| ID | COORDINATE X | COORDINATE Y | WIDTH OF CHARACTER STRING | HEIGHT OF CHARACTER STRING | CHARACTER STRING |
|---|---|---|---|---|---|
| 17 | 319 | 552 | 147 | 45 | Bank Transfer Details: |
| 18 | 319 | 620 | 181 | 46 | AAB BRANCH OFFICE |
| 19 | 500 | 620 | 179 | 46 | OF XXY BANK |

FIG.13A

| ITEM NAME | ITEM VALUE |
|---|---|
| BANK NAME | XXX BANK |
| BRANCH NAME | AAA BRANCH OFFICE |
| ACCOUNT TYPE | ORDINARY ACCOUNT |
| ACCOUNT NUMBER | 1234567 |
| ACCOUNT HOLDER'S NAME | XXX Co., Ltd. |

| INVOICE NUMBER | PAYEE | BILLING DATE | INVOICE AMOUNT | BANK NAME | BRANCH NAME | ... |
|---|---|---|---|---|---|---|
| A123-03 | YYY Co., Ltd. | 2018/07/20 | 1,790,208 | XXX BANK | AAA BRANCH OFFICE | ... |
| ... | | | | | | ... |

< Confirmation and Editing of Form

| | 162 164 | 168 | 161 163 |
|---|---|---|---|

INVOICE — 164a

Bill to: ZZZ Co., Ltd.   XXX Co., Ltd.
Billing Date: July 20, 2018

Client Number: A-4567-89
Invoice Number: A123-03
Closing Date: June, 2018

Total Invoice Amount: 1,790,208 JPY
Consumption Tax: 132,608 JPY
Payment Due Date: August 20, 2018

Please wire transfer the above invoice amount to the following bank account.

Bank Transfer Details:  — 164b
Bank: AAA Branch Office, XXX Bank
Bank Account Type: Ordinary Account
Bank Account: 1234567
Account Name: XXX Co., Ltd.

Unprocessed

Invoice Information

| | |
|---|---|
| Invoice Number: A-123-03 | Billing Date: July 20, 2018 |
| Payee: XXX Co., Ltd. | Payment Due Date: October 11, 2019 |
| Invoice Amount (Tax included): 1,790,208 | Invoice Amount (Tax excluded): 1,657,600 |
| | Payment Method: Cash |

— 165

Bank Information

| | |
|---|---|
| Transfer Service Fee: To be paid by payer | |
| Account Name: XXX Co., Ltd. | |
| 1234567 | 9999 |
| | AAA Branch Office |
| | 999 |
| | Ordinary Account |

— 166

Payment

Refer to Master — 167c

| | |
|---|---|
| Payment Method: Wire Transfer | Service Fee: To be paid by payer |
| Bank Name: XXX Bank | Branch Name: AAA Branch Office |
| Type: Ordinary Account | Account Number: 1234567 |
| Account Holder's Name: XXX Co., Ltd. | |
| Month: Select Month | Day: Select Day |

— 167

Sample Data          Save as draft    Confirm
                          169         170

FIG.17

< Confirmation and Editing of Form

INVOICE

Bill to: ZZZ Co., Ltd.
XXX Co., Ltd.
Billing Date: July 20, 2018

Client Number: A1-4567-89
Invoice Number: A123-03
Closing Date: June, 2018

Total Invoice Amount: 1,790,208 JPY
Consumption Tax: 132,608 JPY
Payment Due Date: August 20, 2018

Please wire transfer the above invoice amount to the following bank account.

Bank Transfer Details:
Bank: AAA Branch Office, XXX Bank
Bank Account Type: Ordinary Account
Bank Account: 1234567
Account Name: XXX Co., Ltd.

Sample Data

Unprocessed

Invoice Information
| Invoice Number | A-123-03 | Billing Date | July 20, 2018 |
| Payee | XXX Co., Ltd. | | |
| Invoice Amount (Tax included) | 1,790,208 | Invoice Amount (Tax excluded) | 1,857,600 |
| | | Payment Due Date | October 11, 2019 |
| | | Payment Method | Cash |

Bank Information
| Transfer Service Fee | To be paid by payer | | |
| XXY Bank | Account Name | XXX Co., Ltd. | AAA Branch Office |
| 1234567 | | | 999 Ordinary Account |
| YYY Bank | Account Name | XXX Co., Ltd. | BBB Branch Office |
| 6666666 | | | 111 Ordinary Account |

Add Bank Information

Payment
| Payment Method | Wire Transfer | Service Fee | To be paid by payee |
| | | | Refer to Master |

Save as draft    Confirm

FIG.18

< Confirmation and Editing of Form

Unprocessed

Invoice — 164a

Bill to: ZZZ Co., Ltd.

XXX Co., Ltd.
Billing Date: July 20, 2018

Client Number: A-4567-89
Invoice Number: A123-03
Closing Date: June, 2018

Total Invoice Amount: 1,790,208 JPY
Consumption Tax: 132,608 JPY
Payment Due Date: August 20, 2018

Please wire transfer the above invoice amount to the following bank account. — 164b Bank Transfer Details:
Bank: AAA Branch Office, XXX Bank
Bank Account Type: Ordinary Account
Bank Account: 1234567
Account Name: XXX Co., Ltd.

Sample Data

Invoice Information — 165
| Invoice Number | A-123-03 | Billing Date | July 20, 2018 |
| Payee | XXX Co., Ltd. | | |
| Invoice Amount (Tax included) | 1,790,208 | Invoice Amount (Tax excluded) | 1,657,600 |

Payment — 167
167c — ✏ Refer to Master
| Payment Method | Wire Transfer ✱ | Service Fee | To be paid by payee ✱ |
| Bank Name | XXX Bank ✱ | Branch Name | AAA Branch Office ✱ |
| Type | Ordinary Account ✱ | Account Number | 1234567 ✱ |
| Account Holder's Name | XXX Co., Ltd. | | |
| Month | Select Month ▼ | Day | Select Day ▼ |

Save as draft — 169    Confirm — 170

| PAYMENT SOURCE ACCOUNT INFORMATION | ZZZ BANK | AAA BRANCH OFFICE | ORDINARY ACCOUNT | 1111111 | YYY Co., Ltd. | TRUE |
|---|---|---|---|---|---|---|
| PAYMENT DESTINATION ACCOUNT INFORMAT | XXX BANK | AAA BRANCH OFFICE | ORDINARY ACCOUNT | 1234567 | YYY Co., Ltd. | TRUE |
| INVOICE AMOUNT | 1,790,208 | | | | | |
| TRANSFER EXECUTION DATE | 2018/08/15 | | | | | |

231

INFORMATION PROCESSING APPARATUS, INFORMATION PROCESSING METHOD, AND COMPUTER PROGRAM PRODUCT

CROSS-REFERENCE TO RELATED APPLICATION

The present application is based on and claims priority under 35 U.S.C. § 119 to Japanese Patent Application No. 2020-133940, filed on Aug. 6, 2020, the content of which is incorporated herein by reference in its entirety.

BACKGROUND OF THE INVENTION

1. Field of the Invention

The present disclosure relates to an information processing apparatus, an information processing method, and a computer program product for recognizing a form.

2. Description of the Related Art

There has been known a form recognition technique for reading character strings from a form image and extracting, as item names and item values, character strings associated with each other from the read character strings.

SUMMARY OF THE INVENTION

According to to one aspect of the present disclosure, an information processing apparatus includes a processor configured to perform operations including:

extracting information indicative of an issuer of a form from form image data, and obtaining fixed information corresponding to the information indicative of the issuer of the form by referring to a storage storing the fixed information associated with the issuer of the form; and outputting, to a terminal apparatus, screen data including the information indicative of the issuer of the form and the obtained fixed information.

BRIEF DESCRIPTION OF THE DRAWINGS

FIG. 3 is an example of a table of an extraction definition database;

FIG. 4 is an example of a table of the extraction definition database;

FIG. 5 is an example of a table of a dictionary database;

FIG. 6 is an example of a table of a vendor database;

FIG. 9 is an example of a table of a job list;

FIG. 12 is a table for explaining character recognition;

FIG. 13A is an example of a table of an extraction result of financial institution information;

FIG. 13B is an example of a table of recognition result data;

FIG. 16 is an example of a display screen;

FIG. 17 is an example of a display screen;

FIG. 18 is an example of a display screen;

FIG. 19 is an example of a display screen;

FIG. 20 is an example of a display screen;

FIG. 21 is an example of a display screen; and

FIG. 22 is a drawing illustrating an example of output data.

DETAILED DESCRIPTION OF THE PREFERRED EMBODIMENTS

There has been known a form recognition technique for reading character strings from a form image and extracting, as item names and item values, character strings associated with each other from the read character strings.

There are many different layouts of forms, and among them, there are forms including item names and item values that are fixed in advance. In the conventional technique, even for such forms including item names and item values that are fixed in advance, users are required to confirm a form recognition result every time the form recognition is performed. In addition, in the conventional technique, when the item names and item values that are fixed in advance are not correctly extracted, users are required to make corrections on every such occasion.

In this manner, in the conventional technique, users have to perform confirmation tasks, correction tasks, and the like even for the item names and item values that are fixed in advance. Therefore, it is troublesome for the users to perform such complicated tasks, which become burdensome for the users.

Accordingly, in view of the above circumstances, it is desired to alleviate burden on users.

Figure 1:
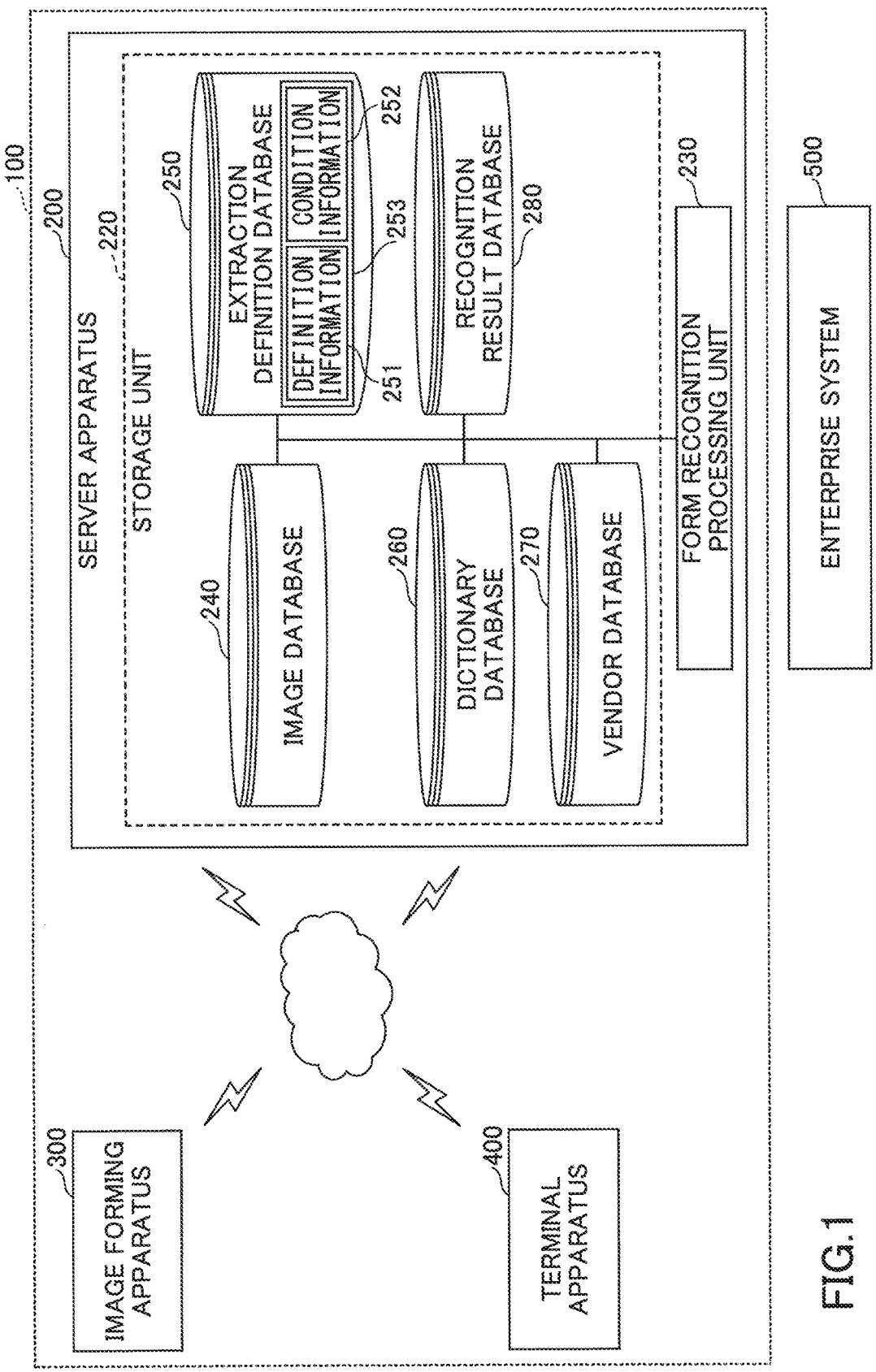
FIG. 1 is a drawing illustrating an example of a system configuration of a form recognition system.

Hereinafter, an embodiment is explained with reference to drawings. FIG. 1 is a drawing illustrating an example of a system configuration of a form recognition system 100 according to the present embodiment.

The form recognition system 100 includes a server apparatus 200, an image forming apparatus 300, and a terminal apparatus 400. In the form recognition system 100 according to the present embodiment, the server apparatus 200, the image forming apparatus 300, and the terminal apparatus 400 are connected via a network.

For example, the terminal apparatus 400 according to the present embodiment is connected to an enterprise system 500 via a network. For example, the enterprise system 500 is a system that performs particular processing using a result obtained by recognizing a form with the form recognition system 100 according to the present embodiment.

In the present embodiment, an invoice is explained as an example of a form.

The form recognition system 100 according to the present embodiment extracts information (invoice information) indicating a payee that issued the invoice and an invoice amount from a form image obtained by reading the invoice. Then, the form recognition system 100 identifies a financial institution corresponding to the extracted payee by referring to vendor information in which payees and financial institutions are associated with each other, the final institutions being institutions to which invoice amounts are transferred. The vendor information is information stored in the server apparatus 200 in advance, and is information in which item names and item values are fixed. In other words, the vendor information is fixed information associated with the payee (the issuer of the form). The vendor information is explained later in detail.

Also, in the present embodiment, with the form recognition, information (financial institution information) about the financial institution, to which the invoice amount is to be transferred, may be extracted from the form image, and the extracted information may be compared against information indicating a financial institution identified from the vendor information.

Also, the enterprise system 500 may be an accounting system that performs transfer and the like of invoice amounts to financial institutions.

In the form recognition system 100 according to the present embodiment, the server apparatus 200 extracts, from the image data indicative of the image of the form read by the scanner function of the image forming apparatus 300, items and the values of the items included in the form to generate text data in which the items and the values of the items are associated with each other.

In the following explanation, the image of the form read by the scanner function of the image forming apparatus 300 is referred to as a form image, and the image data indicative of the form image is referred to as form image data.

In the following explanation, a process of extracting the name of an item (i.e., an item name) included in the form image and the value of the item corresponding thereto (i.e., an item value) and converting the item and the value of the item into text data in which the item and the value of the item are associated with each other is referred to as form recognition.

The server apparatus 200 according to the present embodiment includes a storage unit 220 and a form recognition processing unit 230. The storage unit 220 stores an image database 240, an extraction definition database 250, a dictionary database 260, a vendor database 270, and a recognition result database 280.

The image database 240 stores form image data.

The extraction definition database 250 stores extraction definition information. The extraction definition information is referred to by the form recognition processing unit 230 when the form recognition processing unit 230 extracts character strings included in the financial institution information from the form image.

The dictionary database 260 stores dictionary information for identifying a financial institution. The dictionary information is information obtained in advance, and is referred to by the form recognition processing unit 230 when a financial institution name or the like is to be identified.

The vendor database 270 stores vendor information about vendors of an organization (i.e., a tenant) that uses the service provided by the form recognition system 100. In other words, the tenant is a payer who pays an invoice amount on a received invoice. Also, the vendor of the tenant is an organization who receives the payment of the invoice amount on the invoice from the tenant that has received the invoice. In other words, the vendor of the tenant is the payee of the issued invoice (the issuer of the form). The vendor information is information stored in the vendor database 270 in advance for each tenant, and is information in which the item names and the item values are fixed in advance.

The recognition result database 280 stores information indicating a result of form recognition performed by the form recognition processing unit 230.

The form recognition processing unit 230 according to the present embodiment obtains the form image data stored in the image database 240 and extracts a character string group included in the form image by performing character recognition. Then, the form recognition processing unit 230 extracts invoice information from the character string group.

Also, the form recognition processing unit 230 extracts the character strings included in the financial institution information from the character string group by referring to the extraction definition information 253 of the extraction definition database 250.

The extraction definition information 253 according to the present embodiment includes: definition information 251 indicating definitions of the character strings included in the financial institution information; and condition information 252 indicating conditions for extracting the character strings included in the financial institution information.

The form recognition processing unit 230 identifies a character string corresponding to the financial institution name from the character string group extracted by the character recognition by referring to the definition information 251, and extracts the character string indicating the financial institution name (a first character string) on the basis of a relationship in position with the identified character string.

Specifically, the first character string is extracted with reference to a reference point, i.e., the character string identified from the character string group extracted by the character recognition. In other words, the character string identified from the character string group extracted by the character recognition is a character string determined to be an extraction reference point for extracting the first character string.

Also, the form recognition processing unit 230 extracts another character string included in the financial institution information (i.e., a second character string) on the basis of a relationship in position with the character string indicating the financial institution name (i.e., the first character string) by referring to the condition information 252.

Specifically, the second character string is extracted with reference to the first character string. In other words, the first character string is a character string identified on the basis of a previous extraction reference point, and is a character string determined to be an extraction reference point with reference to which the second character string is extracted.

Then, the form recognition processing unit 230 generates financial institution information by associating the first character string and the second character string with each other from the form image data.

Also, the form recognition processing unit 230 determines the financial institution name and the like on the basis of: the character string extracted based on the extraction definition information 253; and the dictionary information stored in the dictionary database 260. Then, the form recognition processing unit 230 stores, to the recognition result database 280, a recognition result obtained by associating the invoice information and the financial institution information.

Also, by referring to the vendor database 270, the form recognition processing unit 230 according to the present embodiment identifies vendor information corresponding to the payee included in the invoice information extracted by the form recognition. Then, the form recognition processing unit 230 may cause the terminal apparatus 400 to display not only the invoice information but also information indicating the financial institution included in the vendor information as payment destination information to which the invoice amount is to be paid.

In the present embodiment, the payment destination information is obtained from the vendor database 270 in this manner, so that, for example, even in a case where there is an error in the financial institution information extracted from the form image data, the payment destination information including the item names and item values that are fixed in advance can be obtained.

Therefore, according to the present embodiment, every time the form recognition is performed, the user (i.e., the tenant) does not have to confirm the financial institution information, so that the burden on the user can be alleviated.

In the present embodiment, the payment destination information may be stored as a part of the recognition result data in the recognition result database 280 in association with the invoice information and the financial institution information.

The form recognition processing unit 230 may convert the recognition result data into a format corresponding to the enterprise system 500, and may output the converted recognition result data to the enterprise system 500.

In the present embodiment, in this manner, with the character recognition in the form recognition, multiple character strings associated with character strings corresponding to the financial institution name can be extracted. In other words, according to the present embodiment, multiple character strings associated with character string extracted from the form image can be extracted, and thus the accuracy of recognition of the form can be improved.

In the form recognition system 100 according to the present embodiment, the image forming apparatus 300 is a multi-function product/printer/peripheral (MFP) with a scanner function. The image forming apparatus 300 is provided with an application for achieving a copy function, a facsimile (FAX) function, a scanner function, and the like, and these functions are implemented by selecting applications corresponding to these functions.

The terminal apparatus 400 according to the present embodiment is used by a user (i.e., a tenant) who uses the form recognition system 100. Also, the terminal apparatus 400 may display a result of form recognition performed by the server apparatus 200.

In the present embodiment, the tenant is, for example, a company or the like. More specifically, for example, the tenant is an office, a company, an organization, or the like that has a contract for using services provided by the form recognition system 100.

In the example of FIG. 1, the server apparatus 200 has a configuration including five databases in the storage unit 220, but is not limited thereto. A part of any given database may be provided in an external apparatus outside of the server apparatus 200, or the databases may be provided entirely in the external apparatus.

In the example of FIG. 1, the server apparatus 200 achieves the form recognition processing unit 230, but the embodiment is not limited thereto. The form recognition processing unit 230 may be implemented by multiple information processing apparatuses.

In the example of FIG. 1, although the form recognition system 100 includes one of each of the image forming apparatus 300 and the terminal apparatus 400, the form recognition system 100 may include any number of image forming apparatuses 300 and any number of terminal apparatuses 400.

Figure 2:
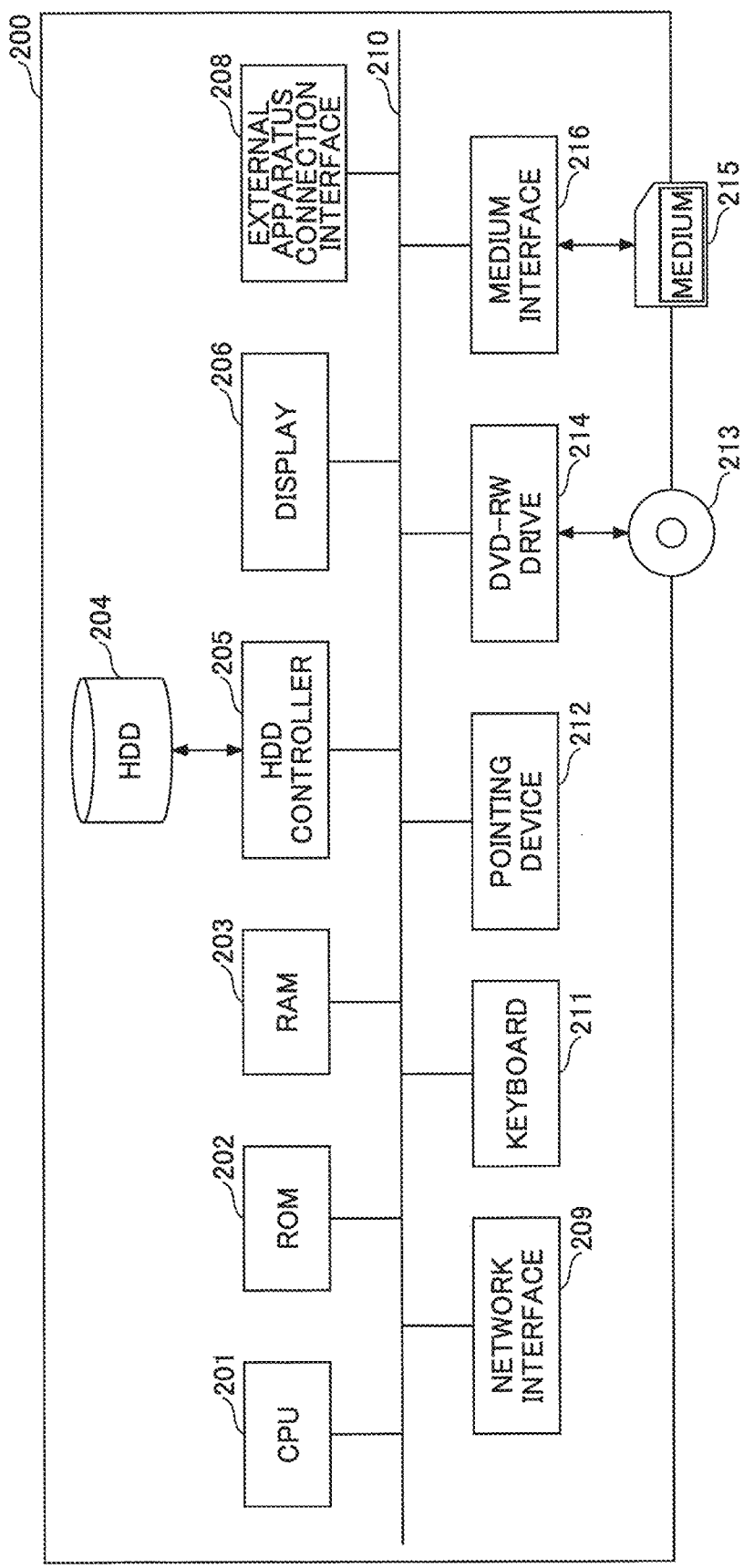
FIG. 2 is a drawing illustrating an example of a hardware configuration of a server apparatus.

Subsequently, a hardware configuration of the server apparatus 200 according to the present embodiment is explained with reference to FIG. 2. FIG. 2 is a drawing illustrating an example of the hardware configuration of the server apparatus 200.

As illustrated in FIG. 2, the server apparatus 200 is constituted by a computer, including a central processing unit (CPU) 201, a read only memory (ROM) 202, a random access memory (RAM) 203, a hard disk drive (HDD) 204, a hard disk drive (HDD) controller 205, a display 206, an external apparatus connection interface (I/F) 208, a network interface (I/F) 209, a bus line 210, a keyboard 211, a pointing device 212, a digital versatile disk rewritable (DVD-RW) drive 214, and a medium interface 216.

Among them, the CPU 201 controls the overall operation of the server apparatus 200. The ROM 202 stores programs used for driving the CPU 201, such as an initial program loader (IPL). The RAM 203 is used as a work area for the CPU 201. The HDD 204 stores various kinds of data such as programs for the server apparatus 200. The HDD controller 205 controls reading or writing of various kinds of data from or to the HDD 204 according to the control of the CPU 201. The display 206 displays various kinds of information such as a cursor, menus, windows, characters, or images. The external apparatus connection interface 208 is an interface for connecting various kinds of external devices. In this case, the external device is, for example, a universal serial bus (USB) memory and a printer. The network interface 209 is an interface for performing data communication using the communication network. The bus line 210 is, for example, an address bus, a data bus, and the like for electrically connecting constituent elements such as the CPU 201 as illustrated in FIG. 2.

The keyboard 211 is a type of input means having multiple keys for inputting characters, numerical values, various instructions, and the like. The pointing device 212 is a type of input means for selecting and executing various instructions, selecting a processing target, moving a cursor, and the like. The DVD-RW drive 214 controls reading or writing of various kinds of data from or to a DVD-RW 213 as an example of a removable recording medium. It should be noted that the removable recording medium is not limited to the DVD-RW, and may be a DVD-R or the like. The medium interface 216 controls reading or writing (storing) of data from or to a recording medium 215 such as a flash memory.

The hardware configuration of the terminal apparatus 400 according to the present embodiment is similar to the server apparatus 200, and explanation thereabout is omitted. The terminal apparatus 400 may be, for example, a tablet-type terminal apparatus, a smartphone, and the like, and instead of the keyboard 211, the pointing device 212, and the display 206, the terminal apparatus 400 may include a display operation apparatus implemented with a touch panel or the like.

Subsequently, the extraction definition database 250 in the server apparatus 200 according to the present embodiment is explained with reference to FIG. 3 and FIG. 4. FIG. 3 is an example of a table of an extraction definition database. FIG. 3 illustrates an example of the definition information 251 included in the extraction definition information 253 of the extraction definition database 250.

The definition information 251 includes, as items of information, an item name, an extraction reference point, an extraction direction, an extraction range, and a dictionary look-up flag. In the extraction definition database 250, an item "item name" and other items are associated with each other, and the definition information 251 is information including the value of the item "item name" and the values of the other items.

The value of the item "item name" indicates an item name associated with the item values. The value of the item "item name" is extracted on the basis of a relationship in position with the character string indicated by the value of the item "extraction reference point" corresponding to the item name. In other words, the value of the item "item name" is an item name associated with the first character string or the second character string.

The value of the item "item name" is also an item of information included in the financial institution information. In the example of FIG. 3, the values of the item "item name" include a bank name, a branch name, an account type, an account number, and an account holder's name. These values are items of financial institution information.

The value of the item "extraction reference point" indicates a character string determined to be the reference point for extracting a character string that is to be the item value of the item name indicated by the value of the item "item name".

The value of the item "extraction direction" indicates a relationship in position between the character string determined to be the reference point and the character string that is to be the item value of the item name indicated by the value of the item "item name". In other words, the value of the item "extraction direction" indicates a direction of a character string (i.e., the second character string) recited in the item value of the item name indicated by the value of the item "item name" with reference to the character string (i.e., the first character string) that has been extracted in the past and that serves as the reference point.

The value of the item "extraction range" indicates the number of character strings to be extracted. The value of the item "dictionary look-up flag" indicates whether processing to confirm the character string is to be performed by referring to the dictionary information stored in the dictionary database 260.

In FIG. 3, for example, a character string that is to be the item value of the item name "Bank Name" is a character string located in the right direction or the downward direction of a character string such as "Bank Transfer Details" (i.e., financial institution and payment destination), and the like from among the character string group extracted from the form image. As a character string that is to be the item value of the item name "Bank Name", a single character string is to be extracted. The character string that is to be the item value of the item name "Bank Name" is a character string determined on the basis of the dictionary database 260.

For example, a character string that is to be the item value of the item name "Branch Name" is a character string located on the right or lower side of the character string determined to be the extraction reference point that is the character string extracted as the item value of the item name "Bank Name". As a character string that is to be the item value of the item name "Branch Name", a single character string is to be extracted. The character string that is to be the item value of the item name "Branch Name" is a character string determined on the basis of the dictionary database 260.

Therefore, in this case, the character string extracted as the item value corresponding to the item name "Bank Name" becomes the first character string, and the character string extracted as the item value corresponding to the item name "Branch Name" becomes the second character string.

For example, the character string that is to be the item value of the item name "Account Type" is a character string located on the right, lower, or left side of the character string determined to be the extraction reference point that is the character string extracted as the item value of the item name "Branch Name". As character strings recited in the item values of the item name "Account Type", two character strings are to be extracted. The character strings recited in the item values of the item name "Account Type" are character strings determined on the basis of the dictionary database 260.

In this case, the character string extracted as the item value corresponding to the item name "Branch Name" becomes the first character string, and the character string extracted as the item values corresponding to the item name "Account Type" become the second character string.

FIG. 4 illustrates an example of a drawing of an extraction definition database. FIG. 4 illustrates the condition information 252 included in the extraction definition information 253.

The condition information 252 includes, as items of information, a branch name extraction condition, an account type extraction condition, and an account number extraction condition. In the extraction definition database 250, information including the value of the item "item name" becomes the condition information 252.

The value of the item "branch name extraction condition" includes a condition for extracting character strings as the item value of the item name "Branch Name". The value of the item "account type extraction condition" includes a condition for extracting character strings as the item values of the item name "Account Type". The value of the item "account number extraction condition" indicates a condition for extracting a character string as the item value of the item name "Account Number".

In FIG. 4, the condition for extracting a character string as the item value of the item name "Branch Name" includes a term "branch", "head office", "office", "main office", or "department" that are recited at the end of the character string. The condition for extracting the character string as the item value of the item name "Account Type" include a term "ordinary account", "checking account", or "savings account" that is included in the character string. The condition for extracting the character string as the item value of the item name "Account Number" is a number included in the character string.

Subsequently, the dictionary database 260 is explained with reference to FIG. 5. FIG. 5 is an example of a table of the dictionary database 260.

The dictionary information stored in the dictionary database 260 according to the present embodiment includes, as items of information, a bank name and a branch name, which are associated with each other. In the present embodiment, information in which the value of the item "Bank Name" and the value of the item "Branch Name" are associated with each other is dictionary information.

In the example of FIG. 5, it can be understood that there are "AAA branch", "CCC branch", "EEE branch" for a bank name "XXX Bank".

Subsequently, the vendor database 270 is explained with reference to FIG. 6. FIG. 6 is an example of a table of the vendor database 270.

The vendor database 270 according to the present embodiment may be provided for each tenant. The vendor database 270 includes, as items of information, a tenant name, a vendor name, basic information, a contact person, payment information, and the like.

In the vendor database 270, the item "tenant name" and other items are associated with each other. In the present embodiment, in the vendor database 270, information including the value of the item "tenant name" and the values of the other items are vendor information.

The value of the item "tenant name" is the name of the tenant, and is information for identifying the tenant. As the information for identifying the tenant, information other than the tenant name may be used. Specifically, for example, as the information for identifying the tenant, a tenant ID and the like may be used.

The value of the item "vendor name" indicates the name of the vendor of the tenant, and is information for identifying the vendor. The vendor means the payee of the invoice. Therefore, the value of the item "vendor name" according to the present embodiment is information for identifying the issuer of the form (i.e., the invoice). As long as the value of the item "vendor name" is information for identifying the vendor, the value of the item "vendor name" may be any information such as a vendor ID and the like for identifying the vendor (i.e., the payee).

The value of the item "Basic Information" is information including a telephone number, an address, and the like of the vendor identified by the vendor name. The value of the item "contact person" is information including a name, contact information, or the like of the contact person.

In the item "Payment Information", items such as "Payment Method", "Financial Institution Name", "Branch Name", "Account Type", "Account Number", "Account Holder's Name", "Service Fee", "Payment Terms", and the like are associated with one another.

The value of the item "Payment Method" indicates a payment method for paying the invoice amount to the vendor. The value of the item "Financial Institution Name" indicates the financial institution, to which the invoice amount is transferred. The value of the item "Branch Name" indicates a branch name of the financial institution, to which the invoice amount is transferred. The values of the items "Account Type", "Account Number", and "Account Holder's Name" indicate an account type, an account number, and an account holder's name, respectively.

The value of the item "Service Fee" indicates which side bears the service fee of the bank transfer. The value of the item "Payment Terms" indicates terms for making the payment.

In the present embodiment, in the vendor database 270, information including the values of the items "Financial Institution Name", "Branch Name", "Account Type", "Account Number", and "Account Holder's Name", associated with the item "Payment Information", is the payment destination information to which the invoice amount is paid.

In this manner, the vendor information according to the present embodiment is fixed information in which the item names and the item values are fixed in advance according to the issuer of the form. More specifically, the payment destination information included in the vendor information stored in the vendor database 270 according to the present embodiment is fixed information in which the item name and the item value are determined in advance according to the issuer of the form. The fixed information is information determined in advance according to the issuer of the form from among pieces of information included in the form. Specifically, the fixed information is information that does not change as long as it is a form issued by the same issuer.

FIG. 6 illustrates an example of the vendor database 270. However, the vendor database 270 does not have to include all the items shown in FIG. 6. For example, the vendor database 270 may include the values of the items "tenant name" and "vendor name" and the values of the items "Financial Institution Name", "Branch Name", "Account Type", "Account Number", and "Account Holder's Name" indicating the payment destination information.

For example, the vendor information for each tenant may include account information and the like of the financial institution held by the tenant. In other words, the vendor information may include payer information of the payer that pays the invoice amount.

Figure 7:
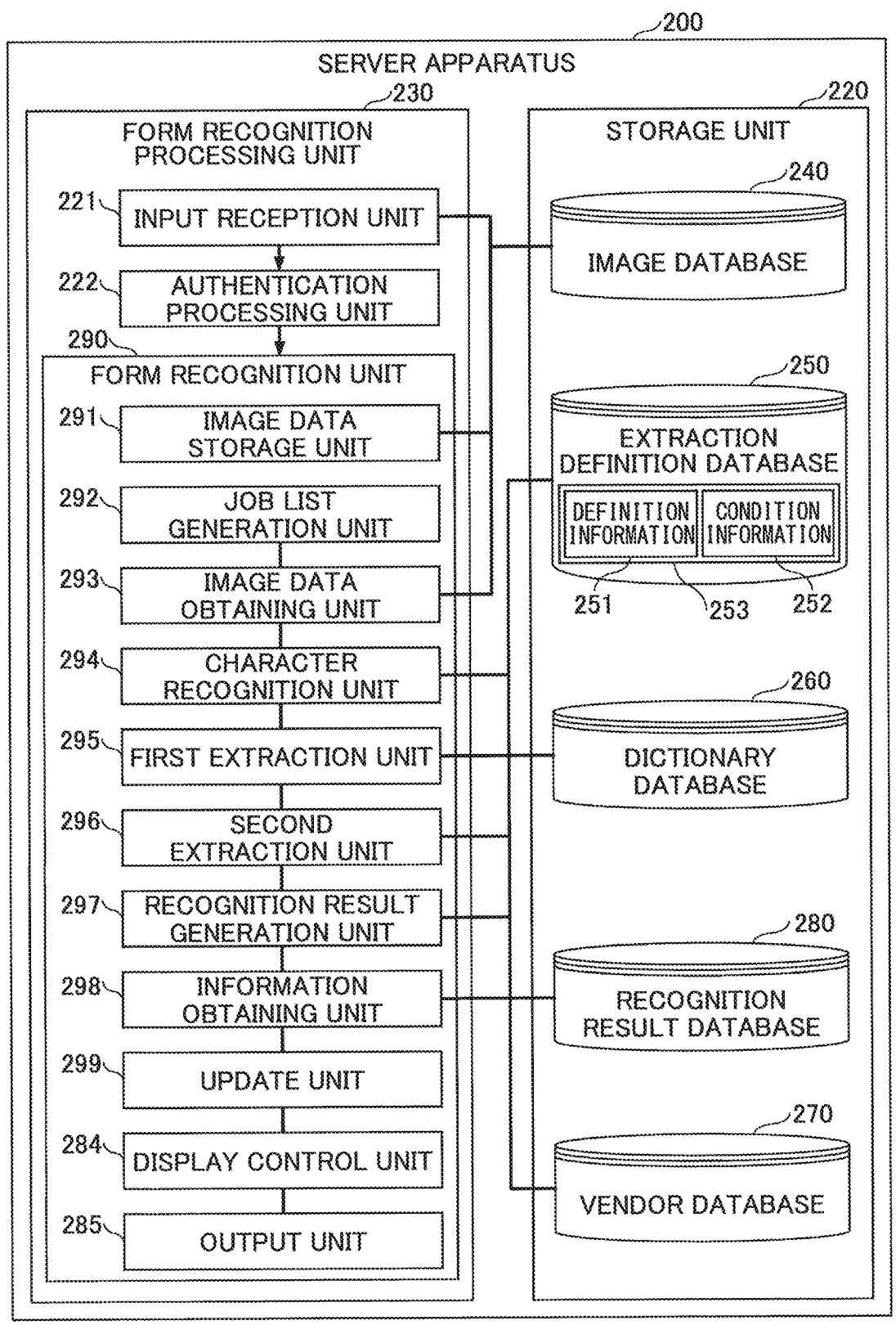
FIG. 7 is a drawing for explaining the functions of the server apparatus.

Subsequently, the functions of the server apparatus 200 are explained with reference to FIG. 7. FIG. 7 is a drawing for explaining the functions of the server apparatus 200.

For example, the server apparatus 200 according to the present embodiment achieves the functions of respective units explained later by causing the CPU 201 to read and execute an information processing program stored in the HDD 204 and the like.

The server apparatus 200 according to the present embodiment includes a form recognition processing unit 230. The form recognition processing unit 230 includes an input reception unit 221, an authentication processing unit 222, and a form recognition unit 290.

The input reception unit 221 receives various kinds of inputs to the server apparatus 200. Specifically, the input reception unit 221 receives an input of authentication information for logging in to the form recognition system 100. For example, the authentication information includes a user ID, a password, and the like. For example, the input reception unit 221 receives an input of for image data transmitted from the image forming apparatus 300.

The authentication processing unit 222 performs authentication on the basis of the authentication information received by the input reception unit 221. For example, the authentication processing unit 222 may transmit the received authentication information to the authentication server provided outside of the server apparatus 200 to obtain a result of authentication performed by the authentication server. When the user is successfully authenticated, the authentication processing unit 222 may pass the form image data received by the input reception unit 221 to the form recognition unit 290.

The form recognition unit 290 according to the present embodiment includes an image data storage unit 291, a job list generation unit 292, an image data obtaining unit 293, a character recognition unit 294, a first extraction unit 295, a second extraction unit 296, a recognition result generation unit 297, an information obtaining unit 298, an update unit 299, a display control unit 284, and an output unit 285.

When the image data storage unit 291 receives form image data from the image forming apparatus 300, the image data storage unit 291 stores the form image data to the image database 240.

The input reception unit 221 receives an input of form image data from the image forming apparatus 300, and the job list generation unit 292 registers a job to a job list 91 and manages the job list 91. The job list 91 is explained later in detail.

The image data obtaining unit 293 obtains the form image data stored in the image database 240.

The character recognition unit 294 extracts, from the form image data, a character string and information indicating the position where the character string is arranged, and stores the character string and the information indicating the position as read resultant information. Therefore, the read result information includes a character string group extracted from the form image data. The read result information is explained later in detail.

The first extraction unit 295 extracts, from the read resultant information, information indicating the payee that issued the invoice and information indicating the invoice amount as character strings, and adopts the information as invoice information. For example, the first extraction unit 295 may store information and the like indicating definitions of character strings included in the invoice information in advance, and may extract character strings included in the invoice information on the basis of the information stored in advance.

The second extraction unit 296 extracts the financial institution information by referring to the definition information 251 and the condition information 252 in the extraction definition database 250. The processing performed by the second extraction unit 296 is explained later in detail Therefore, the first extraction unit 295 is an example of an invoice information extraction unit for extracting invoice information from form image data. The second extraction unit 296 is an example of a financial institution information extraction unit for extracting financial institution information from form image data.

The recognition result generation unit 297 generates recognition result data in which invoice information extracted by the first extraction unit 295 and financial institution information extracted by the second extraction unit 296 are associated with each other.

The information obtaining unit 298 obtains payment information corresponding to the payee included in the invoice information from the vendor database 270. Specifically, by referring to the vendor database 270, the information obtaining unit 298 identifies vendor information of which the vendor name matches the payee included in the invoice information extracted by the first extraction unit 295. Then, the information obtaining unit 298 obtains the payment information included in the identified vendor information. Further, the information obtaining unit 298 according to the present embodiment obtains the payment destination information included in the payment information from the obtained payment information.

The update unit 299 updates the vendor database 270 in a case where the payment destination information is edited on the confirmation screen for confirming the recognition result displayed on the terminal apparatus 400.

The display control unit 284 controls display of the screen of the terminal apparatus 400 and the like. Specifically, the display control unit 284 generates screen data indicating a recognition result confirmation screen displayed on the terminal apparatus 400.

The output unit 285 outputs, to the terminal apparatus 400, screen data indicating a recognition result confirmation screen generated by the display control unit 284. In other words, the output unit 285 causes the web browser (the display) of the terminal apparatus 400 to display the recognition result confirmation screen generated by the display control unit 284. Also, the output unit 285 converts the recognition result data into data in a format compatible with the enterprise system 500 and outputs the converted data.

Figure 8:
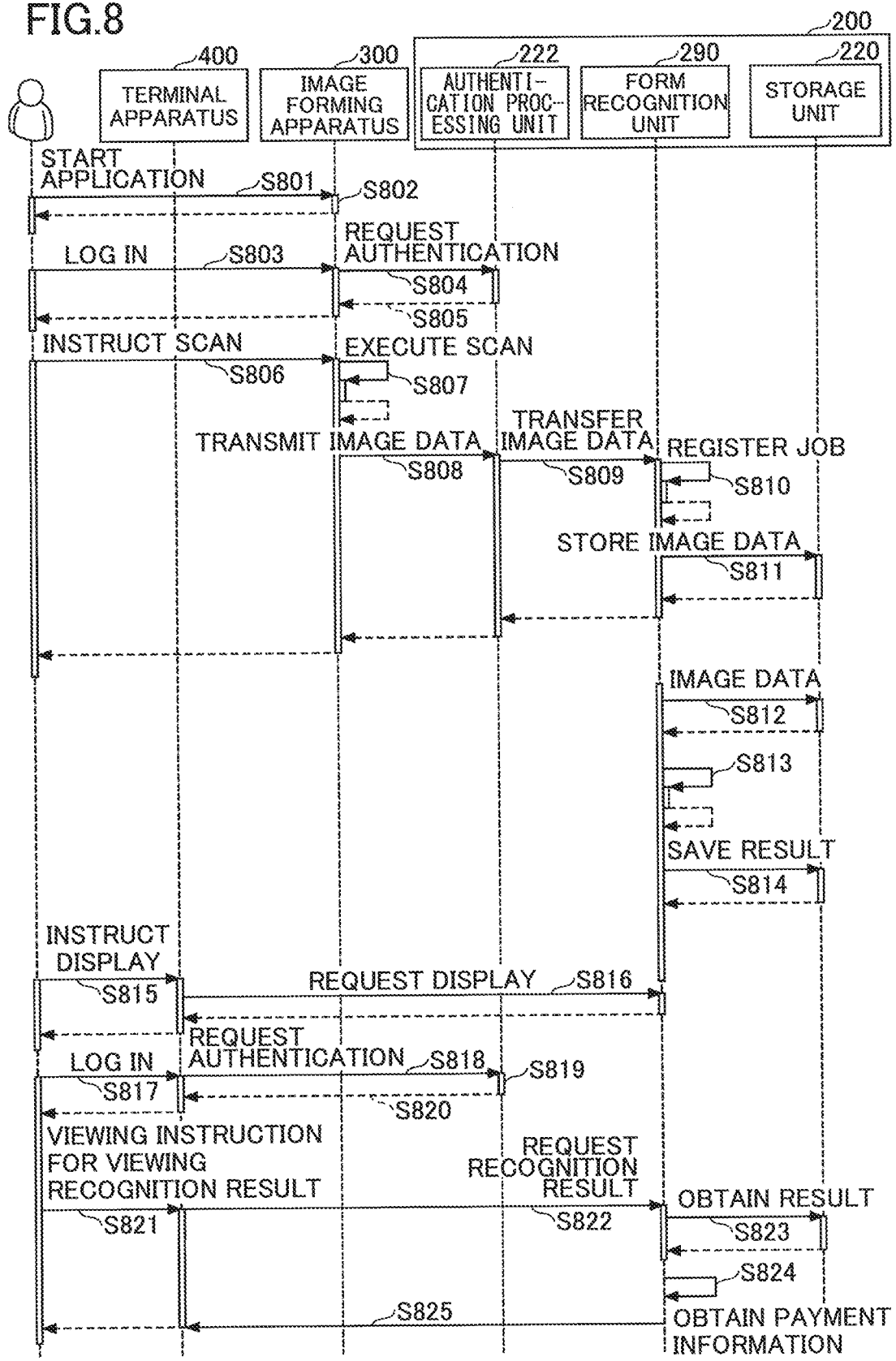
FIG. 8 is a sequence diagram for explaining an operation of a form recognition system.

Hereinafter, operations of the form recognition system 100 according to the present embodiment are explained with reference to FIG. 8. FIG. 8 is a sequence diagram for explaining operations of the form recognition system 100.

In the form recognition system 100, when the image forming apparatus 300 receives a start request of an application for performing form recognition from a user (step S801), the image forming apparatus 300 starts the application (step S802). The user is, for example, an administrator of the tenant.

Subsequently, when the image forming apparatus 300 receives an input of authentication information from the user (step S803), the image forming apparatus 300 transmits an authentication request with the authentication information to the server apparatus 200 (step S804).

Upon receiving the authentication request, the server apparatus 200 causes the authentication processing unit 222 to perform authentication, and notifies the result to the image forming apparatus 300 (step S805). In the flow of this example, the user is assumed to be successfully authenticated.

Subsequently, the image forming apparatus 300 receives a scan instruction of the form (step S806), and the image forming apparatus 300 scans the form to obtain form image data (step S807). Subsequently, the image forming apparatus 300 transmits the form image data to the server apparatus 200 (step S808).

In the server apparatus 200, when the input reception unit 221 receives an input of form image data, the authentication processing unit 222 passes the received form image data to the form recognition unit 290 (step S809). In the example of FIG. 8, the form image data is passed via the authentication processing unit 222 to the form recognition unit 290 but the embodiment is not limited thereto. The form image data may be passed to the form recognition unit 290 without going through the authentication processing unit 222.

When the form recognition unit 290 of the server apparatus 200 receives form image data, the job list generation unit 292 registers a job to the job list 91 (step S810). Subsequently, in the form recognition unit 290, the image data storage unit 291 stores the form image data to the image database 240 (step S811).

Subsequently, in the form recognition unit 290, the image data obtaining unit 293 obtains the form image data that is to be recognized from the image database 240 (step S812), and executes processing for recognizing the form image (step S813).

Specifically, in the form recognition unit 290 according to the present embodiment, the first extraction unit 295 extracts invoice information from the character string group included in the read resultant information, the second extraction unit 296 extracts financial institution information from the character string group, and the recognition result generation unit 297 generates recognition result data in which the invoice information and the financial institution information are associated with each other.

Also, in the form recognition unit 290, the information obtaining unit 298 generates complemented read result information obtained by complementing the character string group of the read result information on the basis of the dictionary database 260. The processing of step S813 is explained later in detail.

Subsequently, the form recognition unit 290 stores recognition result data generated by the recognition result generation unit 297 to the recognition result database 280 (step S814).

In the form recognition system 100, when the terminal apparatus 400 receives an input of a display instruction for displaying the recognition result data on the browser from a user (step S815), the terminal apparatus 400 transmits a display request for displaying the recognition result data on the browser to the server apparatus 200 to display the recognition result data on the browser (step S816).

Also, the terminal apparatus 400 receives an input of authentication information from the user (step S817), and transmits the authentication information to the server apparatus 200 (step S818).

In the server apparatus 200, the authentication processing unit 222 authenticates the user (step S819), and notifies the result to the terminal apparatus 400 (step S820). In the flow of this example, the user is assumed to be successfully authenticated.

Subsequently, when the terminal apparatus 400 receives an input of a viewing instruction for viewing the recognition result of the form image from the user (step S821), the terminal apparatus 400 transmits a viewing request to the server apparatus 200 (step S822).

Upon receiving the viewing request, the server apparatus 200 obtains recognition result data stored in the recognition result database 280 (step S823). Subsequently, the server apparatus 200 obtains payment information included in the recognition result data (step S824). The processing of step S824 is explained later in detail.

Subsequently, the server apparatus 200 generates a recognition result confirmation screen and causes the recognition result confirmation screen to be displayed on the browser of the terminal apparatus 400 (step S825) to allow the user to confirm the recognition result on the displayed recognition result confirmation screen, and then ends the processing.

In this case, the job list 91 generated by the job list generation unit 292 according to the present embodiment is explained with reference to FIG. 9. FIG. 9 is an example of a table of the job list 91.

When the server apparatus 200 according to the present embodiment receives form image data from the image forming apparatus 300, the server apparatus 200 stores the form image data with the job list 91 in which the form image data and the job ID are associated with each other by the job list generation unit 292.

The job list 91 according to the present embodiment includes as items of information, a job ID, a user ID, a form image file path, a recognition result file path, and a status.

The value of the item "job ID" is an identifier for identifying a job. In other words, the value of the item "job ID" is an identifier for identifying the form image data received from the image forming apparatus 300.

The value of the item "user ID" is an identifier for identifying a user who has logged in to the form recognition system 100.

The value of the item "image file path" is information indicating the location where the form image data is stored. The value of the item "recognition result file path" is information indicating the location where the recognition result data, i.e., the result obtained by recognizing the form image, is stored.

The value of the item "status" indicates a progress of recognition of the form image. In other words, the value of the item "status" indicates the status of a job.

In the present embodiment, the values of the item "status" include four values, i.e., (1) an unprocessed status, (2) a draft-saved status, (3) a confirmed status, and (4) an external output-finished status. Each status is as follows.

(1) The unprocessed status: a status immediately after the recognition result data has been obtained by the form recognition, and in which confirmation and the like of the recognition result has not been performed.

(2) The draft-saved status: a status during the task of confirmation and the like of the recognition result data and in which the recognition result data has not yet been confirmed.

(3) The confirmed status: a status when the task of confirmation and the like of the recognition result data has been finished and the recognition result data has been stored to the recognition result database 280 as confirmed information.

(4) The external output-finished status: a status in which the recognition result data has been output to an accounting system and the like linked to the form recognition system 100.

When the server apparatus 200 according to the present embodiment receives the form image data from the image forming apparatus 300, the job list generation unit 292 adds to the job list 91 a record with a job ID associated with the user ID obtained as the authentication information. Then, when the form image data is stored to the image database 240, the job list generation unit 292 adds information indicating the storage destination as the value of the item "image file path" to the image database 240.

Further, when the form definition information to be referred to is identified in the recognition of the form image, the job list generation unit 292 adds the definition ID as the value of the item "definition ID". Then, when the job list 91 is completed, and the recognition result data is stored to the recognition result database 280, the job list generation unit 292 adds information indicating the storage destination as the value of the item "recognition result file path", and changes the value of the item "status" to "finished".

In the present embodiment, for example, the job list 91 generated by the job list generation unit 292 may be displayed. In this case, the user can confirm the progress of the recognition of the form image by seeing the job list screen displayed on the basis of the job list.

Figure 10:
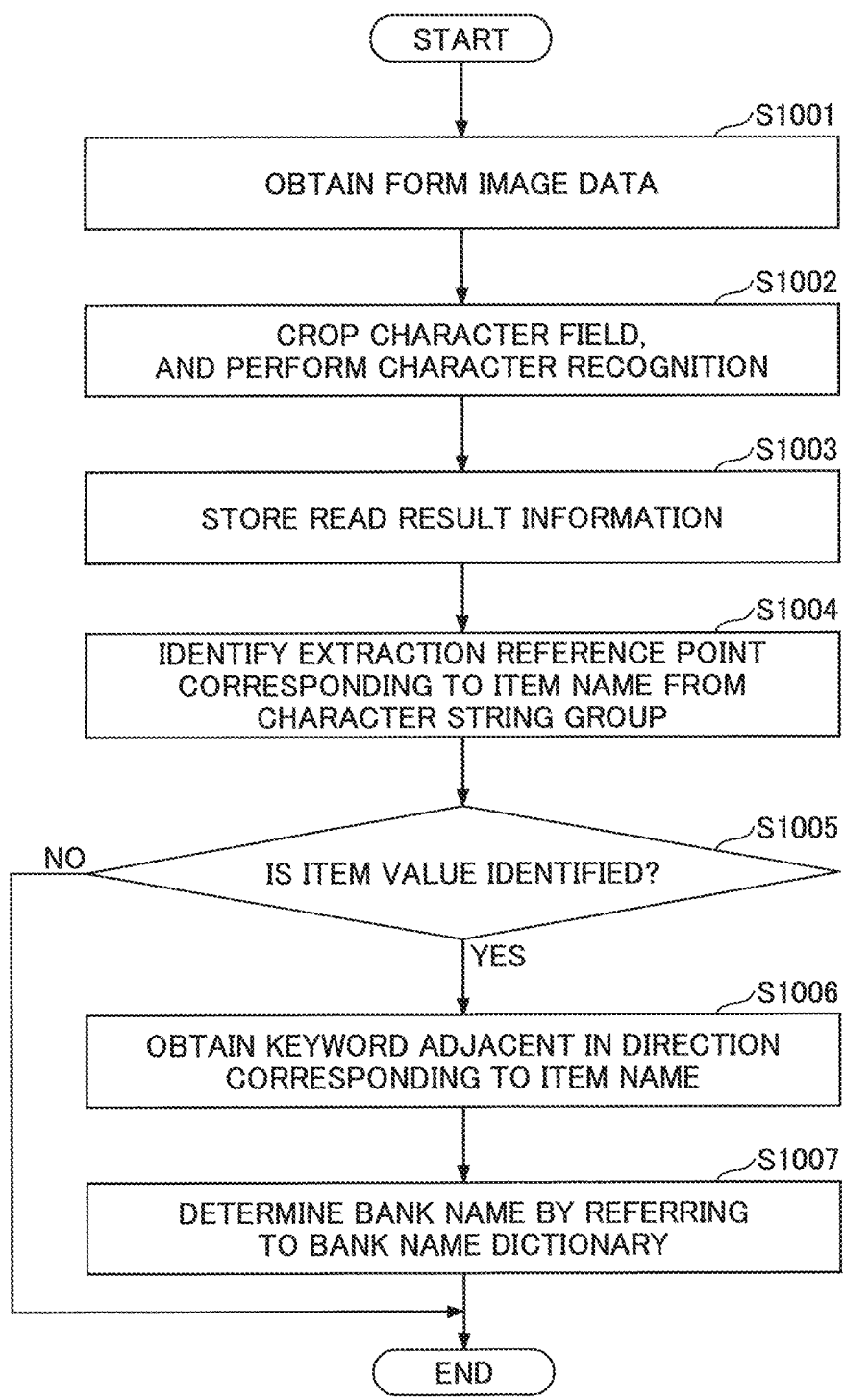
FIG. 10 is a first part of a flowchart for explaining processing performed by a form recognition unit.

Subsequently, processing performed by the form recognition unit 290 according to the present embodiment is explained with reference to FIG. 10 and FIG. 11. FIG. 10 illustrates processing of step S813 of FIG. 8 in detail.

FIG. 10 is a first part of a flowchart for explaining processing performed by the form recognition unit. More specifically, FIG. 10 illustrates processing for extracting a character string determined to be the item value of the item name "Bank Name" in the financial institution information.

In the form recognition unit 290 according to the present embodiment, the image data obtaining unit 293 obtains the form image data from the image database 240 (step S1001).

Subsequently, in the form recognition unit 290, the character recognition unit 294 crops an area in which characters are formed (hereinafter referred to as a character field) from the form image and crops characters in the cropped character field to perform character recognition (step S1002). In this case, the character recognition unit 294 also obtains coordinates indicating positions of the cropped characters.

Subsequently, the form recognition unit 290 generates and stores read resultant information on the basis of a relationship in position of each character recognized by the character recognition unit 294 (step S1003). Specifically, the form recognition unit 290 recognizes, as a single character string, characters of which distances are within a threshold value defined in advance, on the basis of coordinates of the recognized characters, and generates read result information by associating the character string and information such as coordinates indicating the position of the area in which the character string is arranged. The read result information is explained later in detail.

Subsequently, in the form recognition unit 290, the second extraction unit 296 identifies, from the character string group of the read resultant information, a character string that matches a character string determined to be an extraction reference point corresponding to the item name "Bank Name" in the definition information 251 (step S1004). In a case where a character string that matches the extraction reference point corresponding to the item name "Bank Name" cannot be found, the second extraction unit 296 may identify a character string a part of which matches the character string determined to be the extraction reference point. In other words, the second extraction unit 296 identifies a character string determined to be a reference point for extracting the item value of the item name "Bank Name".

Subsequently, the second extraction unit 296 determines whether the character string determined to be the extraction reference point of the item name "Bank Name" has been identified in step S1003 (step S1005).

In step S1005, in a case where a corresponding character string is not identified, the second extraction unit 296 ends the processing for extracting the item value of the item name "Bank Name".

In a case where the character string determined to be the extraction reference point of the item name "Bank Name" is identified in step S1005, the second extraction unit 296 extracts, from the character string group of the read resultant information, a character string arranged in a direction indicated by the extraction direction corresponding to the item name "Bank Name" in the definition information 251 (step S1006). In this case, the character string extracted here is a character string that is the item value of the item name "Bank Name".

Subsequently, the second extraction unit 296 determines the item value of the item name "Bank Name" by comparing the dictionary information stored in the dictionary database 260 and the character string extracted in step S1006 (step S1007), and ends the processing for extracting the item value of the item name "Bank Name".

In the embodiment, before the second extraction unit 296 extracts the financial institution information, the first extraction unit 295 may perform processing to extract the invoice information from the form image data. The processing for extracting the invoice information by the first extraction unit 295 may be performed after the processing to extract the financial institution information by the second extraction unit 296.

In the example of FIG. 10, it is assumed that in step S1007, the second extraction unit 296 determines the item value of the bank name by referring to the dictionary information stored in the dictionary database 260, but the second extraction unit 296 does not have to refer to the dictionary database 260.

Figure 11:
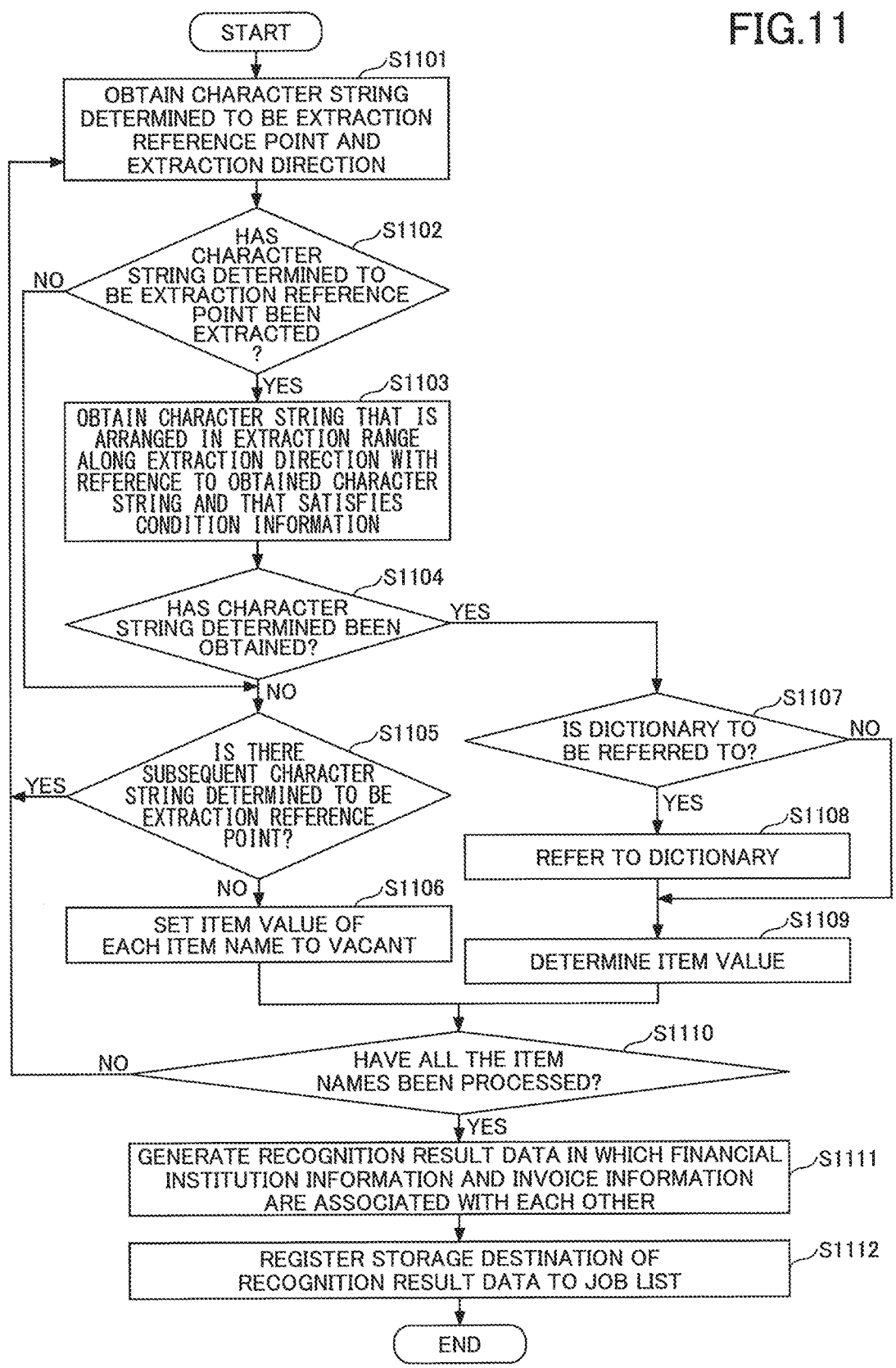
FIG. 11 is a second part of the flowchart for explaining the processing performed by the form recognition unit.

FIG. 11 is a second part of a flowchart for explaining processing performed by the form recognition unit. FIG. 11 illustrates processing for extracting a character string that is the item value of an item name subsequent to the item name "Bank Name" in the financial institution information.

In the form recognition unit 290 according to the present embodiment, the second extraction unit 296 obtains both the character string determined to be the extraction reference point and the extraction direction corresponding to the target item name of which the item value is to be extracted (i.e., the extraction target item name) by referring to the definition information 251 (step S1101).

Subsequently, the second extraction unit 296 determines whether the character string determined to be the extraction reference point has been obtained (step S1102). In a case where the corresponding character string has not been obtained in step S1102, the second extraction unit 296 proceeds to step S1105 explained later.

In a case where the corresponding character string has been obtained in step S1102, the second extraction unit 296 obtains, by referring to the definition information 251, a character string that is arranged in the extraction range along the extraction direction with reference to the obtained character string and that satisfies the condition information 252 (step S1103).

Subsequently, the second extraction unit 296 determines whether the corresponding character string has been obtained in step S1103 (step S1104). In a case where the second extraction unit 296 determines whether the corresponding character string has been obtained in step S1104, the second extraction unit 296 proceeds to step S1107 explained later.

In a case where the second extraction unit 296 determines whether the corresponding character string has not been obtained in step S1104, the second extraction unit 296 determines whether there is a subsequent character string determined to be the extraction reference point (step S1105).

In a case where the second extraction unit 296 determines that there is a subsequent character string in step S1105, the second extraction unit 296 returns back to step S1101.

In a case where the second extraction unit 296 determines that there is not any subsequent character string in step S1105, the second extraction unit 296 determines that the item value of each item name included in the definition information 251 is vacant (step S1106), and proceeds to step S1110 explained later. Therefore, in the present embodiment, in a case where the item value of the item name "Bank Name" is not extracted here, the item values of all of the item names of the financial institution information are vacant.

In a case where the second extraction unit 296 determines whether the corresponding character string has not been obtained in step S1104, the second extraction unit 296 determines whether the dictionary database 260 is to be referred to by referring to the value of the item "dictionary look-up flag" in the definition information 251 (step S1107).

In a case where the second extraction unit 296 determines whether the dictionary database 260 is not to be referred to in step S1107, the second extraction unit 296 proceeds to step S1109 explained later.

In a case where the second extraction unit 296 determines that the dictionary database 260 is to be referred to in step S1107, the second extraction unit 296 compares the extracted character string by referring to the dictionary database 260 (step S1108).

Subsequently, the second extraction unit 296 determines a character string that is to be the item value of the item name (step S1109).

Subsequently, the second extraction unit 296 determines whether all the item names included in the definition information 251 have been associated with the item values (step S1110). In a case where the second extraction unit 296 determines that all the item names have not been associated with the item values in step S1110, the second extraction unit 296 returns back to step S1101.

In a case where the second extraction unit 296 determines that all the item names have been associated with the item values in step S1110, the form recognition unit 290 causes the recognition result generation unit 297 to generate the recognition result data in which the financial institution information and the invoice information are associated with each other (step S1111).

Subsequently, the recognition result generation unit 297 registers the storage destination of the recognition result data to the job list 91 (step S1112), and ends the processing.

In this manner, the second extraction unit 296 according to the present embodiment repeats the processing for adopting the character string extracted on the basis of the relationship in position with the character string determined to be the extraction reference point, as a character string determined to be a subsequent extraction reference point. Then, the second extraction unit 296 according to the present embodiment adopts the character string extracted on the basis of the relationship in position with the character string determined to be the extraction reference point as the item value of the item name corresponding to the character string determined to be the extraction reference point.

Subsequently, the processing of the form recognition unit 290 is specifically explained with reference to FIG. 12, FIG. 13A, and FIG. 13B. FIG. 12 is a table for explaining character recognition.

Information 121 illustrated in FIG. 12 is a result obtained by performing character recognition on the form image data by the character recognition unit 294.

The information 121 is an example of information including: a result obtained by cropping the character field and recognizing characters in the character field; and coordinates indicating the positions of the recognized characters.

The character recognition unit 294 according to the present embodiment recognizes a character string by joining characters at adjacent positions from the information 121. Specifically, the character recognition unit 294 may recognize, as a single word, a combination of characters among which the distances are within a predetermined pixel.

The information 122 as illustrated in FIG. 12 is information indicating the character string recognized by the character recognition unit 294 and the area of the character string, and is the result information obtained by reading the form image with the character recognition unit 294.

The character recognition unit 294 recognizes, as a single cell, an area separated by a vertical line and a horizontal line from the form image data, and gives, to each cell, identification information (cell ID) for identifying the cell.

The information 122 as illustrated in FIG. 12 is information indicating an association between the area of each cell recognized from the form image and its cell ID.

In FIG. 12, for example, an area in which the character string "Bank Transfer Details" is recognized is identified from the height and the width on the basis of the position indicated by the X coordinates and the Y coordinates in the information 121.

It is understood that, in the information 121, an area in which a character "B" is recognized includes a cell ID "72". Therefore, the keyword "Bank Transfer Details" is associated with a cell ID "17" as the character string included in the read resultant information.

The form recognition unit 290 according to the present embodiment associates the character string and the cell in the form image data in this manner.

FIG. 13A is an example of a table of an extraction result of financial institution information. First, the second extraction unit 296 according to the present embodiment extracts the bank name from among the items included in the financial institution information through the processing of FIG. 10.

Specifically, the second extraction unit 296 identifies the character string determined to be the extraction reference point of the first item name "Bank Name" in the definition information 251 from the character string group of the read resultant information. Then, the second extraction unit 296 identifies the character string determined to be the item value of the item name "Bank Name" on the basis of the relationship in position with the identified character string (i.e., the first character string) defined by the definition information 251.

In the definition information 251, the item name "Bank Name" is a character string located in the right or lower direction of the character string determined to be the extraction reference point.

In this case, for example, when the character string "Bank Transfer Details" is identified from the character string group of the read resultant information, the second extraction unit 296 adopts a character string located on the right side or the lower side of the character string "Bank Transfer Details" as the item value of the item name "Bank Name" by using the character string "Bank Transfer Details" as the extraction reference point.

In a case where multiple definitions of extraction directions are found in the definition information 251, whether there is a character string at the position in the extraction direction is determined in the order of the definitions of the extraction directions.

It can be understood that in the example of FIG. 13A, a character string "XXX Bank" is identified as the item value of the item "Bank Name".

In this case, for example, even in a case where the bank name indicated by the character string identified by the item value of the item "Bank Name" obtained through the character recognition is incorrect, the second extraction unit 296 compares the bank name with the dictionary information, and adopts a character string matching a portion of the identified character string with the character string indicating the bank name.

Subsequently, the second extraction unit 296 identifies a character string determined to be the extraction reference point for the extraction of the item value of the subsequent item name "Branch Name" in the definition information 251. In the definition information 251, the character string determined to be the extraction reference point for the extraction of the item value of the item name "Branch Name" is the bank name that has already been extracted. Therefore, in this case, the character string "XXX Bank" becomes the character string determined to be the extraction reference point.

Because the extraction direction for the extraction of the item value of the item name "Branch Name" is the right and lower sides, first, the second extraction unit 296 determines whether there is a character string on the right side of the character string "XXX Bank". Then, in a case where a character string is found on the right side, the found character string is adopted as the item value of the item name "Branch Name".

Also, in a case where a character string is not found on the right side, the second extraction unit 296 determines whether there is a character string on the lower side of the character string "XXX Bank". Then, in a case where a character string is found on the lower side, the found character string is adopted as the item value of the item name "Branch Name".

The second extraction unit 296 performs the above processing on all the item names included in the financial institution information, so that information in which the item names and the item values are associated with each other is extracted as financial institution information 131.

FIG. 13B is an example of a table of recognition result data 141. The recognition result data 141 according to the present embodiment includes data in which the financial institution information 131 extracted by the second extraction unit 296 and invoice information 142 extracted by the first extraction unit 295 are associated with each other. The recognition result data according to the present embodiment may include payment destination information. The recognition result data 141 in FIG. 13B does not have to include the payment destination information (i.e., does not have to include the recognition result data 141).

For example, the invoice information 142 includes, as items of information, an invoice number for identifying an invoice, an issuer of the invoice (i.e., a payee), a billing date, an invoice amount, and the like.

Figure 14:
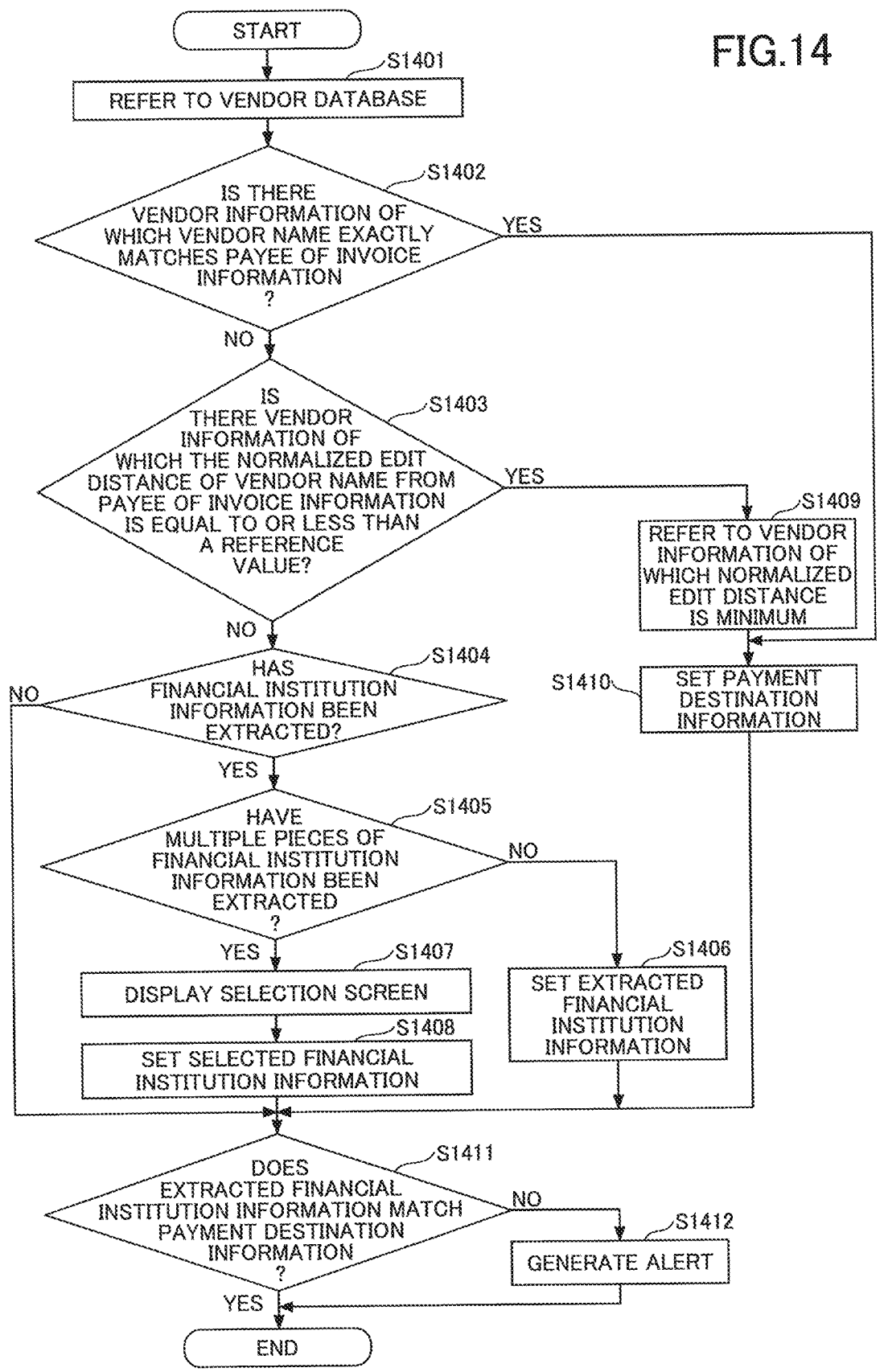
FIG. 14 is a third part of the flowchart for explaining processing performed by the form recognition unit.

Subsequently, the processing of step S824 of FIG. 8 is explained in detail with reference to FIG. 14. FIG. 14 is a third part of the flowchart for explaining the the processing performed by the form recognition unit. FIG. 14 is processing performed by the information obtaining unit 298 of the form recognition unit 290.

When the information obtaining unit 298 according to the present embodiment obtains the recognition result data in step S823 of FIG. 8, the information obtaining unit 298 refers to the vendor database 270 (step S1401). Subsequently, the information obtaining unit 298 determines whether the vendor database 270 includes vendor information of which the vendor name exactly matches the payee of the invoice information included in the recognition result data (step S1402).

In a case where it is determined that the vendor database 270 includes corresponding vendor information in step S1402, the information obtaining unit 298 proceeds to step S1410 explained later.

In a case where it is determined that the vendor database 270 does not include vendor information in step S1402, the information obtaining unit 298 determines whether the vendor database 270 includes vendor information of which the normalized edit distance of the vendor name from the payee of the invoice information is equal to or less than a reference value (step S1403). In this case, so long as whether there is vendor information of which the vendor name is similar to the payee can be determined, the method for determining the similarity is not particularly limited, and may be any method other than the method for deriving the normalized edit distance.

In a case where it is determined that the vendor database 270 includes the corresponding vendor information in step S1403, the information obtaining unit 298 proceeds to step S1409 explained later.

In a case where it is determined that the vendor database 270 does not include the corresponding vendor information in step S1403, the information obtaining unit 298 causes the second extraction unit 296 to determine whether the financial institution information has been extracted (step S1404).

Specifically, the information obtaining unit 298 determines whether the recognition result data 141 includes the financial institution information 131.

In a case where it is determined that the financial institution information has not been extracted in step S1404, the information obtaining unit 298 proceeds to step S1411 explained later.

In a case where it is determined that the financial institution information has been extracted in step S1404, the information obtaining unit 298 determines whether multiple pieces of financial institution information have been extracted (step S1405).

In a case where multiple pieces of financial institution information have not been extracted in step S1405, i.e., a single piece of financial institution information has been extracted, the information obtaining unit 298 sets the financial institution information in the payment destination information (step S1406), and proceeds to step S1411 explained later.

In a case where multiple pieces of financial institution information have been extracted step S1405, the information obtaining unit 298 causes the terminal apparatus 400 to display a selection screen for selecting one of the multiple pieces of financial institution information (step S1407), sets the selected financial institution information as the payment destination information (step S1408), and proceeds to step S1411 explained later.

In a case where it is determined that the vendor database 270 includes the corresponding vendor information in step S1403, the information obtaining unit 298 refers to the vendor information of which the normalized edit distance is the minimum (step S1409).

Subsequently, the information obtaining unit 298 obtains the payment information included in the vendor information referred to, and sets the payment destination information included in the payment information (step S1410).

Subsequently, the information obtaining unit 298 compares the financial institution information extracted by the second extraction unit 296 against the payment destination information included in the vendor information of the vendor database 270, and determines whether the financial institution information matches the payment destination information (step S1411).

In a case where the financial institution information does not match the payment destination information in step S1411, the information obtaining unit 298 generates an alert that is to be displayed on the confirmation screen of the recognition result, and ends the processing.

In a case where it is determined that the financial institution information matches the payment destination information in step S1411, the information obtaining unit 298 ends the processing.

In the present embodiment, in this manner, the vendor information of which the vendor name is the same as or similar to the payee extracted from the form image data is retrieved from the vendor database 270, and as a portion of the vendor information, the payment destination information included in the payment information stored in advance is set in the recognition result data.

Therefore, in the present embodiment, when a tenant makes payment of an invoice amount to a payee, it is not necessary to confirm the payment destination information displayed on the confirmation screen of the recognition result on every occasion, and thus the work load of the tenant (i.e., the user) can be alleviated.

In addition, in the present embodiment, in a case where the vendor database 270 does not include the vendor information corresponding to the payee, the financial institution information extracted from the form image data is set as the payment destination information, so that the tenant (i.e., the user) is saved from the trouble of inputting the payment destination information.

Further, in the present embodiment, the payment destination information obtained from the vendor database 270 and the financial institution information extracted from the form image data are compared, and in a case where the payment destination information and the financial institution information do not match, an alert is displayed on the confirmation screen of the recognition result. Therefore, according to the present embodiment, the user can be prompted to confirm whether the payment destination information extracted by the server apparatus 200 is correct.

Figure 15:
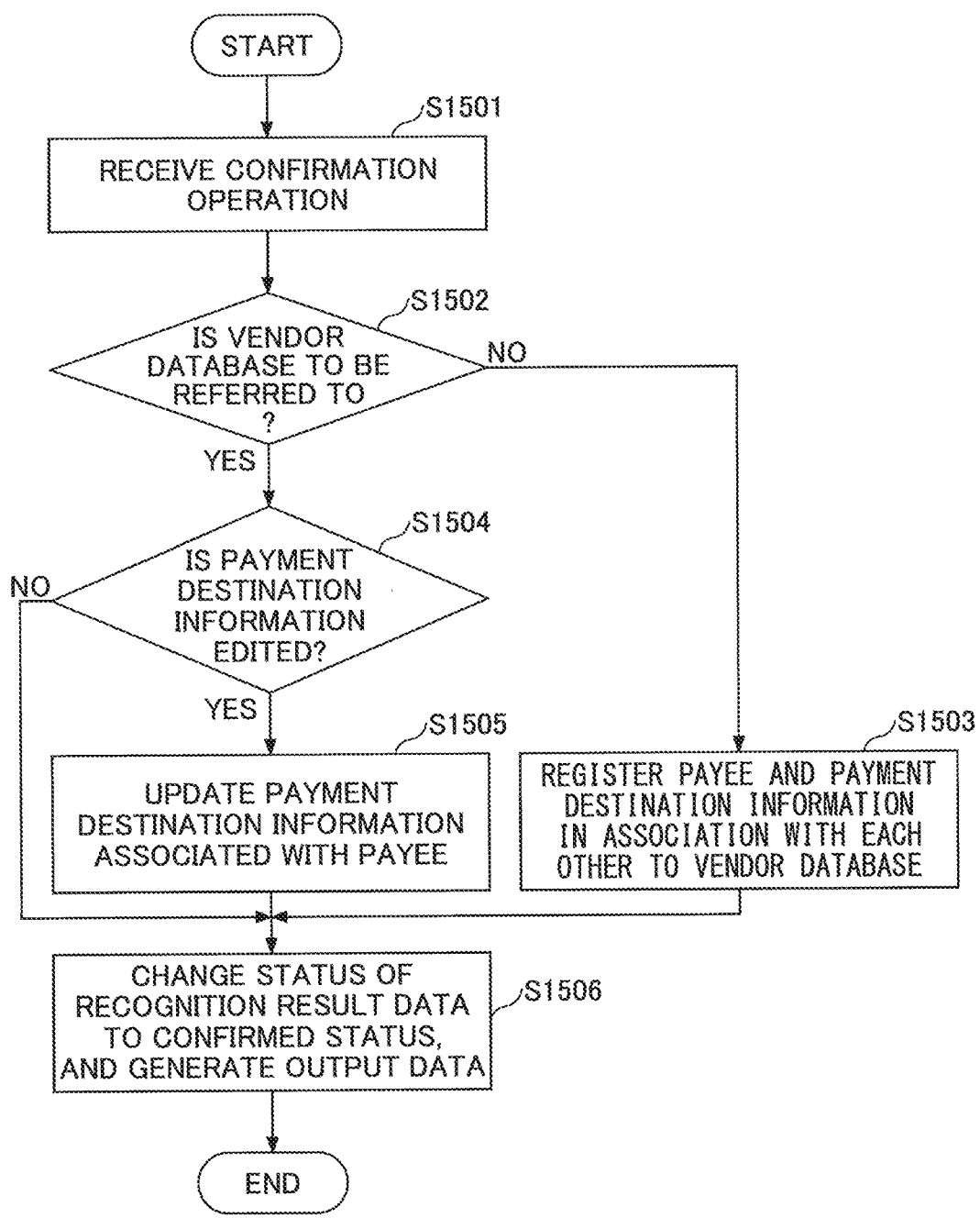
FIG. 15 is a fourth part of the flowchart for explaining processing performed by the form recognition unit.

Subsequently, the processing performed by the update unit 299 in a case where the payment destination information displayed on the confirmation screen of the recognition result is updated is explained with reference to FIG. 15. FIG.

15 is a fourth part of the flowchart for explaining processing performed by the form recognition unit. The processing as illustrated in FIG. 15 is processing performed by the update unit 299 after an operation for changing the status of the recognition result data to a confirmed status is performed on the confirmation screen of the recognition result.

When the update unit 299 according to the present embodiment receives the operation for changing the status of the recognition result data to the confirmed status (step S1501), a determination is made as to whether the vendor database 270 is to be referred to in the processing performed by the information obtaining unit 298 (step S1502).

In a case where it is determined that the vendor database 270 is not to be referred to in step S1502, the update unit 299 associates, with the payee, the currently set payment destination information (the character string extracted by the second extraction unit 296), stores (registers) the payee and the payment destination information as new vendor information to the vendor database 270 (step S1503), and proceeds to step S1506.

In a case where it is determined that the vendor database 270 is to be referred to in step S1502, the update unit 299 determines whether the payment destination information has been edited (step S1504). In a case where it is determined that the payment destination information has not been edited in step S1504, the update unit 299 proceeds to step S1506 explained later.

In a case where it is determined that the payment destination information has been edited in step S1504, the update unit 299 updates the payment destination information associated with the vendor name corresponding to the payee in the vendor database 270 (step S1505).

Specifically, for example, the update unit 299 may determine that the payment destination information has been edited in a case where, in the vendor database 270, the payment information included in the vendor information of which the vendor name is the same as or similar to the payee does not match the payment destination information that was set when an operation for changing the status of the recognition result data to the confirmed status was received.

Subsequently, the update unit 299 changes the status of the recognition result data to the confirmed status, and the output unit 285 generates output data (step S1506), and ends the processing.

In the present embodiment, in this manner, in a case where the payment destination information has been edited, the vendor database 270 can be updated according to the edited content. Therefore, in the present embodiment, the user (i.e., the tenant) can update the vendor database 270 (i.e., the master data) with a single edit operation of the payment destination information. Therefore, in the present embodiment, it is not necessary to perform confirmation, correction, or the like of the payment destination information every time the recognition is performed, and thus the burden on the user can be alleviated.

Subsequently, an example of display according to the present embodiment is explained with reference to FIG. 16 to FIG. 21. FIG. 16 is an example of a display screen 161.

The display screen 161 illustrated in FIG. may be displayed on, for example, the terminal apparatus 400. The display screen 161 is an example of a confirmation screen of a recognition result displayed on the browser of the terminal apparatus 400 in step S826.

The display screen 161 includes a display field 162, a display field 163, and operation buttons 169, 170. In the display field 162, a form image indicated by the form image data is displayed. In the example of FIG. 16, the form is an invoice, and the form image includes an area 164a for displaying the invoice information and an area 164b indicating the financial institution information.

The display field 163 shows recognition result data of a result obtained by causing the form recognition unit 290 to perform form recognition on the form image data indicating the form image displayed on the display field 162.

The display field 163 includes display fields 165, 166, 167, and 168. The invoice information 142 is displayed in a display field 165. The invoice information 142 is a portion of recognition result data. The financial institution information 131 is displayed in the display field 166. The payment destination information is displayed in a display field 167. The value of the item "status" of the job list 91 is displayed in a display field 168.

In the example of FIG. 16, the invoice information 142 extracted from the area 164a is displayed in the display field 165, and the financial institution information 131 extracted from the area 164b is displayed in the display field 166. In the example of FIG. 16, there is only a single piece of financial institution indicated by financial institution information 131 extracted from the area 164b.

In the example of FIG. 16, payment destination information obtained from vendor information corresponding to "XXX Co., Ltd." that is the payee included in the invoice information 142 is displayed in the display field 167.

In the example of FIG. 16, the payee is "XXX Co., Ltd.". Accordingly, the information obtaining unit 298 of the form recognition unit 290 refers to the vendor database 270. Then, the information obtaining unit 298 determines whether there is vendor information of which the vendor name exactly matches "XXX Co., Ltd.".

In this case, the vendor database 270 includes the corresponding vendor information (see FIG. 6), and accordingly, the information obtaining unit 298 extracts a financial institution, a branch name, an account type, an account number, and an account holder's name from the payment information included in the corresponding vendor information, and sets the extracted information as the payment destination information in the display field 167.

In the present embodiment, the financial institution information displayed in the display field 166 matches the payment destination information displayed in the display field 167, and accordingly, an alert is not generated, and an alert is not displayed on the display screen 161.

Also, the display field 167 includes a display component 167c for editing the payment destination information displayed on the display field 167.

In the present embodiment, when an operation for selecting the display component 167c included in the display field 167 is received, the content displayed in the corresponding display field can be edited. Editing of the content displayed in the detail.

The operation button 169 is an operation button for changing the value of the status of the job list 91 from the unprocessed status to the draft-saved status. When the operation button 169 is operated, the display field 168 changes from "Unprocessed" to "Draft-saved".

The confirm button 170 is an operation button for changing the value of the status of the job list 91 to the confirmed status. In the present embodiment, when the confirm button 170 is operated, the value of the status of the job list 91 is changed to the confirmed status. In the present embodiment, the recognition result data of which the status has been changed to the confirmed status can be converted by the output unit 285 into data of a format corresponding to the enterprise system 500.

FIG. 17 is an example of a display screen 161A. In the display screen 161A illustrated in FIG. 17, the area 164b indicating the financial institution information includes information indicating multiple financial institutions.

In this case, multiple pieces of financial institution information are displayed in the display field 166A included in the display field 163A. The display field 163A includes selection fields 166a, 166b for selecting the respective pieces of financial institution information.

In the example of FIG. 17, the user can select one of the multiple pieces of financial institution information by selecting one of the selection fields 166a, 166b.

In the example of FIG. 17, when any one of the multiple pieces of financial institution information is selected, the information obtaining unit 298 refers to the vendor database 270 to identify the vendor information of which the vendor name matches "XXX Co., Ltd." and of which the financial institution name matches the financial institution name included in the selected one of the multiple pieces of financial institution information. Then, the information obtaining unit 298 may extract the payment destination information from the identified vendor information, and may display the payment destination information in the display field 167.

In the example of FIG. 17, the selection fields for selecting the financial institution information are displayed on the display screen 161A, i.e., the confirmation screen of the recognition result, but the embodiment is not limited thereto. The selection fields for selecting the financial institution information may be displayed on the terminal apparatus 400 and the like before the confirmation screen of the recognition result is displayed.

In the present embodiment, for example, a financial institution of which an account is held by the tenant may be registered in a tenant database (not illustrated) of the storage unit 220 in advance, and in a case where multiple pieces of financial institution information are extracted, financial institution information including the same financial institution name as the financial institution name corresponding to the registered tenant may be automatically selected. In this case, the service fee for transfers between financial institutions can be saved. Further, in the present embodiment, transfer service fees for transfers between different financial institutions are stored in the storage unit 220, and a financial institution providing transfer to the financial institution corresponding to the tenant with less transfer service fee may be automatically selected from among the multiple extracted financial institutions. Alternatively, information indicating the extracted financial institution and information indicating the financial institution corresponding to the tenant may be transmitted to another system via a network, and transfer service fees may be received from the another system, so that a financial institution with a lower transfer service fee may be automatically selected on the basis of the received transfer service fees.

FIG. 18 is an example of a display screen 161B. In the display screen 161B as illustrated in FIG. 18, the display field 163B does not include the display field 166 for displaying the financial institution information. In other words, in the example of FIG. 18, the display field 163B includes a display field 165 and a display field 167 indicating invoice information and payment destination information, respectively.

In the present embodiment, for example, in a case where the financial institution information extracted by the second extraction unit 296 exactly matches the payment destination information obtained by the information obtaining unit 298, the financial institution information extracted from the form image data may be omitted, and only the payment destination information, i.e., the item names and item values that are fixed in advance, is displayed.

In the present embodiment, in this manner, by omitting the financial institution information, only the information necessary for the user who is viewing the display screen 161B can be presented.

Figure 19:
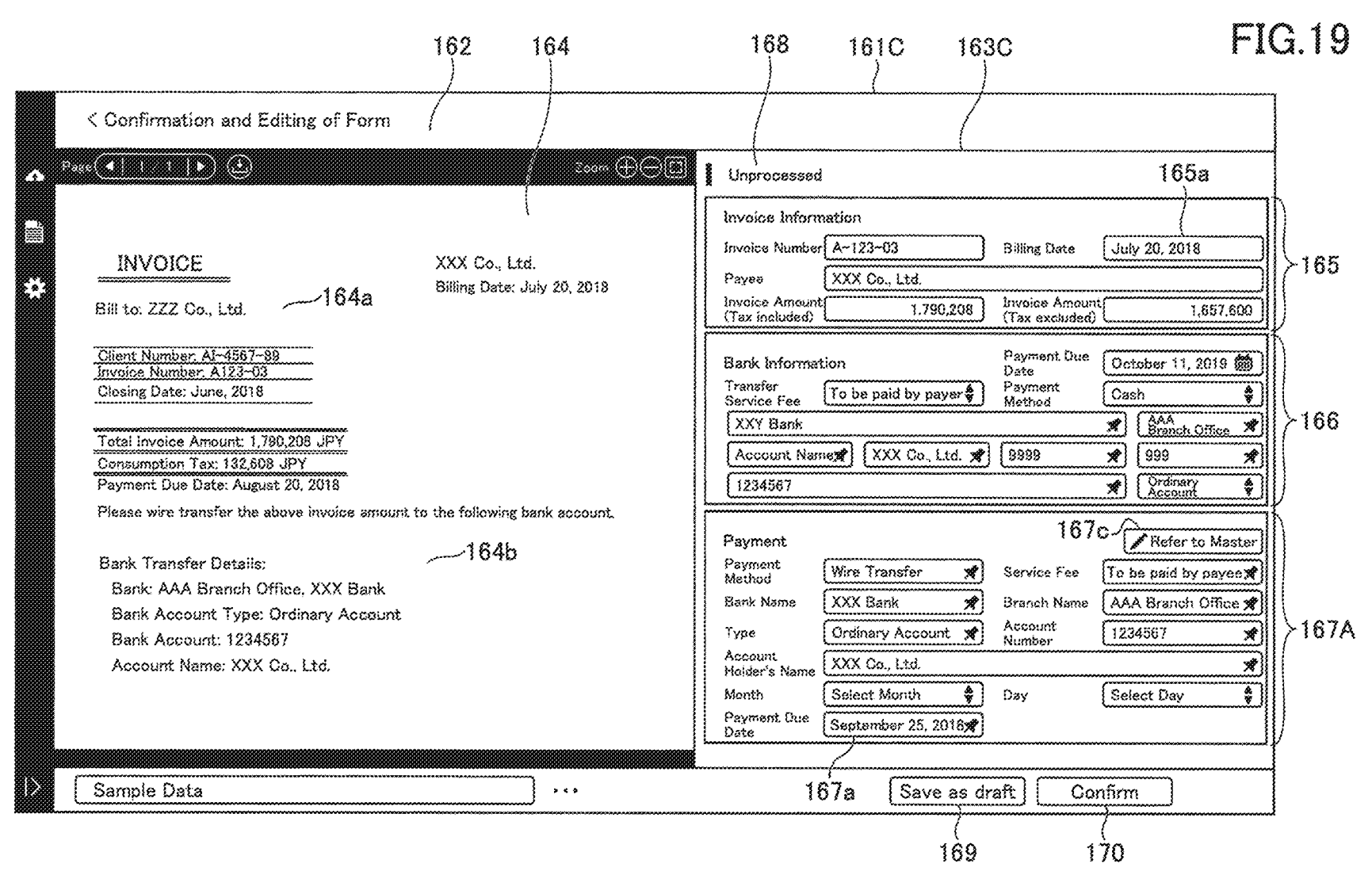

FIG. 19 is an example of a display screen 161C. In the display screen 161C illustrated in FIG. 19, a content other than the payment destination information is automatically displayed in a display field 167A.

In the display screen 161C illustrated in FIG. 19, a billing date is displayed in a display field 165a of the display field 165. The billing date is information included in the invoice information.

In FIG. 19, for example, the information obtaining unit 298 sets a payment due date displayed in a display field 167a of the display field 167A by referring to the billing date and the payment information included in the vendor information of which the vendor name is "XXX Co., Ltd.".

In the vendor database 270, the value of the item "Payment Terms" of the payment information included in the vendor information of which the vendor name is "XXX Co., Ltd." is "payment due date: 25th of the month after next" (see FIG. 6). Therefore, the information obtaining unit 298 derives "Sep. 25, 2018" as the 25th of the month after next of the billing date, Jul. 20, 2018, and displays "Sep. 25, 2018" in the display field 167a.

In this manner, in the present embodiment, information other than the payment destination information displayed in the display field 167 may be automatically set on the basis of the invoice information and the payment information.

Therefore, in the present embodiment, the items that are to be manually input by the user (i.e., the tenant) can be reduced, and the burden on the user can be alleviated.

Figure 20:
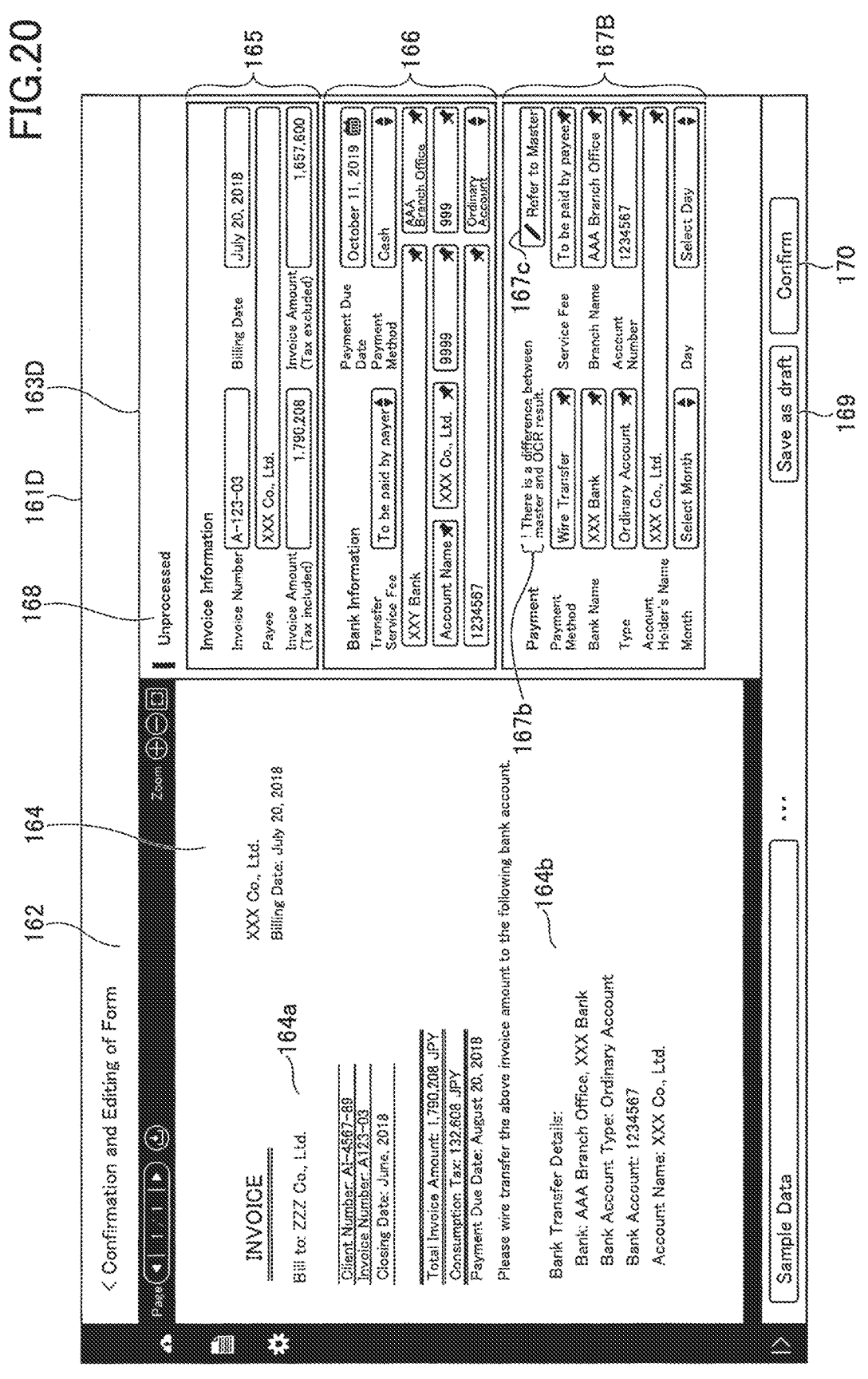

FIG. 20 is an example of a display screen 161D. In the display screen 163D illustrated in FIG. 20, the financial institution information extracted from the form image data by the second extraction unit 296 does not match the payment destination information obtained from the vendor database 270 by the information obtaining unit 298.

In the display screen 161D, a display field 167B includes an alert 167b indicating that the financial institution information does not match the payment destination information. In the present embodiment, a screen for editing the vendor information stored in the vendor database 270 can be displayed by operating the display component 167c.

Examples of cases where the financial institution information does not match the payment destination information include a case where the vendor information referred to is incorrect, a case where the financial institution included in the vendor information name has been changed, and a case where a character string that is not the character string indicating the payee has been extracted as the payee by mistake.

Figure 21:
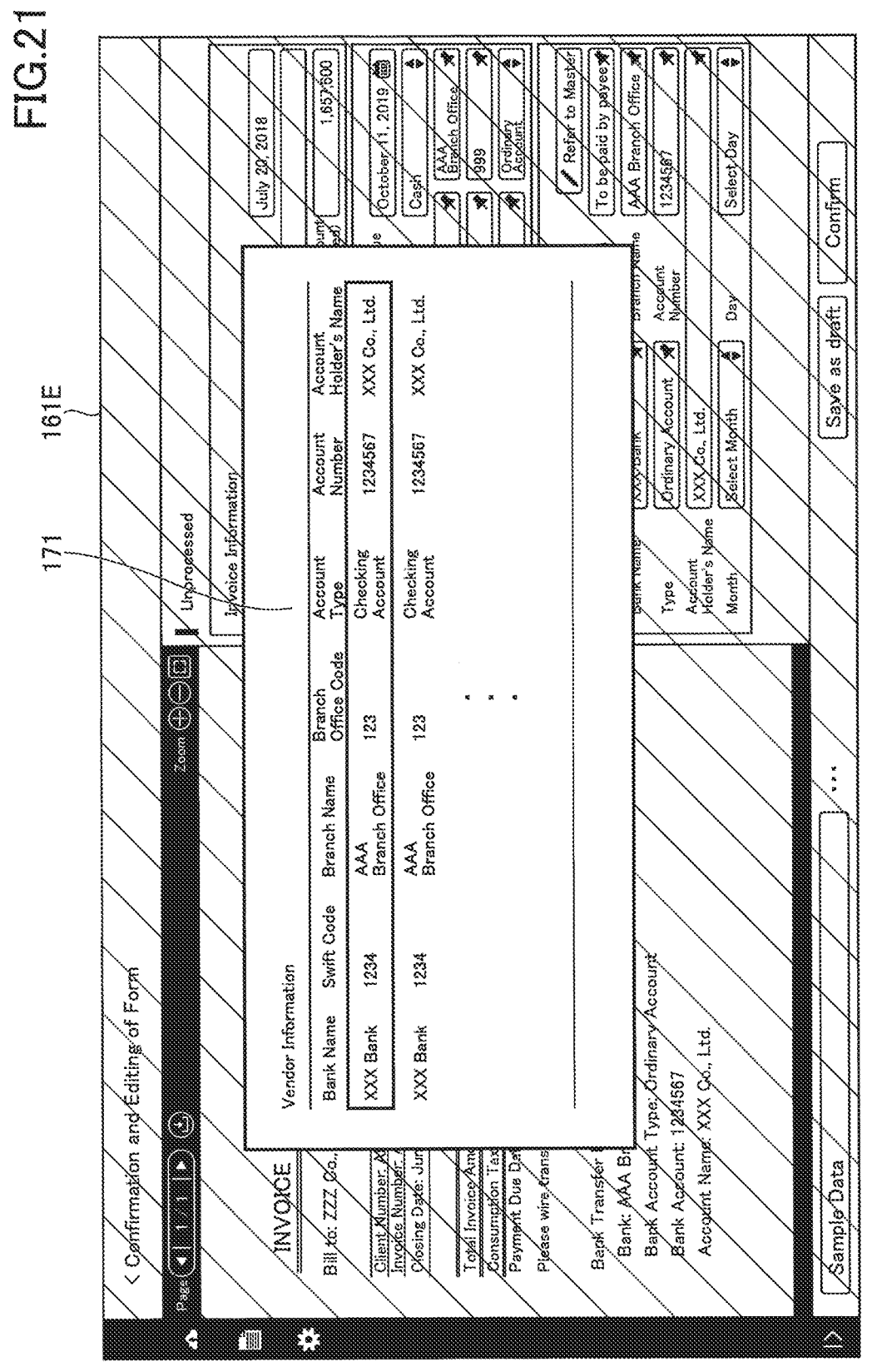

FIG. 21 is an example of a display screen 161E. The display screen 161E as illustrated in FIG. indicates a screen that is displayed after the display component 167c has been operated in the display screen 161D as illustrated in FIG. 20.

A window 171 for editing the vendor information of which the vendor name is "XXX Co., Ltd." is displayed in the display screen 161E.

A list of vendor information of which the vendor name is "XXX Co., Ltd." from among multiple pieces of vendor information stored in the vendor database 270 is displayed in the window 171.

In the present embodiment, for example, in a case where the vendor information referred to includes an error, the user can select, from the window 171, the vendor information that is to be referred to.

Also, in the present embodiment, for example, in a case where there is a change in the financial institution name, the corresponding vendor information can be edited in the window 171.

In the present embodiment, when the user performs such an operation to edit the corresponding vendor information and thereafter operates the confirm button 170, and accordingly, the value of the status of the job list 91 is changed to the confirmed status, then, the recognition result data that has been changed to the confirmed status is converted by the output unit 285 into data of a format corresponding to the enterprise system 500.

Subsequently, an example of data that is output to the enterprise system 500 by the output unit 285 according to the present embodiment is explained with reference to FIG. 22.

FIG. 22 is an example of a table of output data. The output data 231 illustrated in FIG. 22 includes payment source information, payment destination information, an invoice amount, a transfer execution date, and the like.

In the output data 231 according to the present embodiment, the payer information is information included in the vendor information stored in the vendor database 270, and is information about accounts held by the tenant.

The payment destination information is payment destination information included in the vendor information stored in the vendor database 270.

The invoice amount is included in the invoice information extracted from the form image data by the form recognition unit 290. For example, the transfer execution date may be a date when the output data 231 was output to the enterprise system 500.

The output data 231 according to the present embodiment may be in a format compatible with the enterprise system 500 that can allow the enterprise system 500 to automatically execute processing for transferring (paying) the invoice amount from the tenant to the payee.

In this manner, in the present embodiment, the payee is identified from the form image data of the invoice, and the payment destination information is obtained from the vendor database 270 in which the item name and the item value are defined in advance.

Therefore, according to the present embodiment, it is not necessary to confirm whether payment destination information is correct every time the payment destination information is displayed on the confirmation screen of the recognition result.

In addition, according to the present embodiment, the financial institution information extracted from the form image data and the payment destination information are compared, and in a case where they do not match, the vendor database 270 serving as the master data can be updated.

Therefore, even in a case where the payment destination information is incorrect, the user is required to correct the master data only once, and the user is saved from the trouble of correcting the payment destination information multiple times.

In the above embodiment, the invoice has been explained as an example of a form, but the types of forms to which the present embodiment can be applied are not limited to the invoice. Also, in the present embodiment, the fixed information is assumed to be the payment destination information, but is not limited thereto.

For example, the form may be a purchase order and the like, and in that case, the fixed information may be an address of a company that makes a purchase, an address to which ordered products are delivered, and the like, which are fixed in advance according to the company that makes the purchase, i.e., the issuer of the purchase order. Alternatively, for example, the form may be an answer sheet of an examination. In that case, for example, the fixed information may be a name of a teacher who teaches a subject of an examination, which is fixed in advance according to the subject of the examination (i.e., information indicating for which subject an examination is conducted) indicating the issuer of the answer sheet.

The functions of the embodiment described above can be implemented by one or a plurality of processing circuits. In this case, the "processing circuit" in this specification is considered to include a processor programmed to execute the functions by software, such as a processor implemented by an electronic circuit, and devices designed to execute the functions described above, such as an ASIC (Application Specific Integrated Circuit), a DSP (Digital Signal Processor), an FPGA (Field Programmable Gate Array), and conventional circuit modules.

The apparatuses used in the above embodiment are merely an example of one of multiple computing environments for implementing the embodiment disclosed in this specification.

In an embodiment, for example, the server apparatus 200 may include multiple computing apparatuses configured as a server cluster. The multiple computing apparatuses are configured to communicate with each other via a communication link of any given type including a network, a shared memory, and the like, and implement the processing disclosed in the present specification. Similarly, the server apparatus 200 may include multiple computing devices configured to be able to communicate with each other.

Furthermore, the server apparatus 200 can be configured to share the disclosed processing steps in various combinations. For example, a process that is executed by the server apparatus 200 may be executed by another server apparatus. Similarly, the functions of the server apparatus 200 can be executed by another server apparatus. The elements of the server apparatus and another server apparatus may be combined in a single server apparatus, or may be distributed among multiple apparatuses.

The tables used in the above embodiment may be generated by machine learning. Alternatively, without using the tables, a model may be generated by performing machine learning of keywords in transaction contents and account titles.

In this case, machine learning is a technique for causing a computer to acquire learning ability like a human being. With the machine learning, the computer can autonomously generate an algorithm used for making a determination such as data identification from training data retrieved in advance, and perform prediction by applying the algorithm to new data. The learning method in the machine learning may be either supervised learning, unsupervised learning, semi-supervised learning, reinforcement learning, or deep learning, and may be a learning method obtained by combining the above learning methods. The learning method for the machine learning is not particularly limited.

Although the present invention has been hereinabove explained on the basis of the embodiments, the present invention is not limited to the particulars of the described examples. These features can be made without departing from the scope of the claimed subject matter, and can be appropriately determined according to the form of application.

The burden on the user can be alleviated.

What is claimed is:

1. An information processing apparatus comprising:
a storage configured to store fixed information associated with an issuer of an invoice, the fixed information being payment destination information indicative of a payment destination to which an invoice amount is to be paid; and
a processor configured to
identify a character string determined to be an extraction reference point, based on a relationship in position with a particular character string, from among a plurality of character strings extracted by character recognition performed on form image data,
extract a character string corresponding to the character string determined to be the extraction reference point, based on a relationship in position with the character string determined to be the extraction reference point,
adopt the character string extracted based on the relationship in position with the character string determined to be the extraction reference point, as an item value of an item name associated with the character string determined to be the extraction reference point, the item name being an item name of information about a financial institution,
associate the item name and the item value with each other and adopt the associated item name and item value as financial institution information,
determine whether the fixed information matches the financial institution information, and
output, to a terminal apparatus, screen data including the item value of the item name,
information of an issuer of the invoice,
the fixed information, and
in response to determining that the payment destination information does not match the financial institution information, information for displaying an alert.

2. The information processing apparatus according to claim 1,
wherein the processor is further configured to update the fixed information in response to the item value of the item name displayed on the terminal apparatus being edited.

3. The information processing apparatus according to claim 2, wherein the processor is further configured to register a character string extracted from the form image data to the storage as the fixed information corresponding to the information of the issuer of the invoice, in response to determining that the fixed information corresponding to the information of the issuer of the invoice is not obtained.

4. An information processing method performed by an information processing system including an information processing apparatus and a terminal apparatus, a processor in the information processing system performing operations comprising:
identifying a character string determined to be an extraction reference point, based on a relationship in position with a particular character string, from among a plurality of character strings extracted by character recognition performed on form image data;
extracting a character string corresponding to the character string determined to be the extraction reference point, based on a relationship in position with the character string determined to be the extraction reference point;
adopting the character string extracted based on the relationship in position with the character string determined to be the extraction reference point, as an item value of an item name associated with the character string determined to be the extraction reference point, the item name being an item name of information about a financial institution;
associating the item name and the item value with each other and adopting the associated item name and item value as financial institution information;
determining whether fixed information stored in a storage matches the financial institution information, the fixed information associated with an issuer of an invoice and the fixed information being payment destination information indicative of a payment destination to which an invoice amount is to be paid; and
outputting, to the terminal apparatus, screen data including the item value of the item name,
information of an issuer of the invoice,
the fixed information, and
in response to determining tat the payment destination information does not match the financial institution information, information for displaying an alert.

5. A non-transitory computer readable medium storing a computer program product for being executed on a computer to perform operations comprising:
identifying a character string determined to be an extraction reference point, based on a relationship in position with a particular character string, from among a plurality of character strings extracted by character recognition performed on form image data;
extracting a character string corresponding to the character string determined to be the extraction reference point, based on a relationship in position with the character string determined to be the extraction reference point;
adopting the character string extracted based on the relationship in position with the character string determined to be the extraction reference point, as an item value of an item name associated with the character string determined to be the extraction reference point, the item name being an item name of information about a financial institution;
associating the item name and the item value with each other and adopting the associated item name and item value as financial institution information;
determining whether fixed information stored in a storage matches the financial institution information, the fixed information associated with an issuer of an invoice and the fixed information being payment destination information indicative of a payment destination to which an invoice amount is to be paid; and
outputting, to a terminal apparatus, screen data including the item value of the item name,
information of an issuer of the invoice,
the fixed information, and
in response determining that the payment destination information does not match the financial institution information, information for displaying an alert.

6. The information processing apparatus according to claim 1, wherein the processor is further configured to obtain fixed information including a partial match of the item value of the item name in response to a complete match of the information of the item name not being found in fixed information stored in a storage.

* * * * *